US011782816B2

(12) United States Patent
Mola

(10) Patent No.: US 11,782,816 B2
(45) Date of Patent: Oct. 10, 2023

(54) INPUT/OUTPUT LOCATION TRANSFORMATIONS WHEN EMULATING NON-TRACED CODE WITH A RECORDED EXECUTION OF TRACED CODE

(71) Applicant: Microsoft Technology Licensing, LLC, Redmond, WA (US)

(72) Inventor: Jordi Mola, Bellvue, WA (US)

(73) Assignee: Jens C. Jenkins, Holladay, UT (US)

( * ) Notice: Subject to any disclaimer, the term of this patent is extended or adjusted under 35 U.S.C. 154(b) by 0 days.

(21) Appl. No.: 16/459,879

(22) Filed: Jul. 2, 2019

(65) Prior Publication Data

US 2020/0301820 A1 Sep. 24, 2020

Related U.S. Application Data

(63) Continuation-in-part of application No. 16/358,221, filed on Mar. 19, 2019, now abandoned.

(51) Int. Cl.
 *G06F 11/36* (2006.01)
 *G06F 9/30* (2018.01)
 *G06F 9/455* (2018.01)

(52) U.S. Cl.
 CPC ...... *G06F 11/3636* (2013.01); *G06F 9/30098* (2013.01); *G06F 9/455* (2013.01);
 (Continued)

(58) Field of Classification Search
 CPC .................. G06F 11/3636; G06F 9/30098
 (Continued)

(56) References Cited

U.S. PATENT DOCUMENTS

| 5,050,168 A | 9/1991 | Paterson |
| 5,664,159 A * | 9/1997 | Richter ............... G06F 11/3648 703/23 |

(Continued)

FOREIGN PATENT DOCUMENTS

| CN | 202080021023.4 | 3/2020 |
| CN | 202080056933.6 | 6/2020 |

(Continued)

OTHER PUBLICATIONS

Godefroid, et al., "Automated Whitebox Fuzz Testing", In Proceedings of Network and Distributed System Security Symposium, Feb. 10, 2008, 16 Pages.

(Continued)

*Primary Examiner* — Lewis A Bullock, Jr.
*Assistant Examiner* — Theodore E Hebert
(74) *Attorney, Agent, or Firm* — WORKMAN NYDEGGER

(57) ABSTRACT

Mapping input locations to enable execution of second executable code using trace data gathered during execution of first executable code. A trace of a prior execution of the first code, and the second code, are accessed. The trace stores data of an input that was consumed by first executable instructions of the first code. It is determined that the stored data of the input is usable as an input to second executable instructions of the second code. A difference in how the first instructions accessed the input during recording, as compared to how the second instructions expect to access input, is identified. Based on the identified difference, a location transformation is determined that would enable the second instructions to access the stored data. Execution of the second instructions is emulated using the stored data, including projecting the location transformation to enable the second instructions to access the stored data.

20 Claims, 15 Drawing Sheets

(52) U.S. Cl.
CPC ........ *G06F 11/3604* (2013.01); *G06F 11/366* (2013.01); *G06F 11/3632* (2013.01); *G06F 11/3652* (2013.01)

(58) Field of Classification Search
USPC ........................................................ 717/128
See application file for complete search history.

(56) References Cited

U.S. PATENT DOCUMENTS

| | | | |
|---|---|---|---|
| 5,758,061 A | 5/1998 | Plum | |
| 5,784,552 A * | 7/1998 | Bishop | G06F 11/3636 714/E11.21 |
| 5,790,871 A * | 8/1998 | Qureshi | G06F 11/2231 702/123 |
| 5,894,575 A * | 4/1999 | Levine | G06F 11/3636 714/E11.215 |
| 6,009,503 A * | 12/1999 | Liedtke | G06F 12/1054 711/E12.063 |
| 6,101,524 A * | 8/2000 | Choi | G06F 9/52 710/264 |
| 6,112,019 A * | 8/2000 | Chamdani | G06F 9/3836 712/214 |
| 6,707,463 B1 * | 3/2004 | Gibson | G06F 9/3879 712/E9.067 |
| 6,901,581 B1 * | 5/2005 | Schneider | G06F 11/3664 717/124 |
| 7,089,453 B2 | 8/2006 | Miyamoto | |
| 7,506,318 B1 * | 3/2009 | Lindo | G06F 11/3644 717/130 |
| 8,468,501 B2 * | 6/2013 | Subhraveti | G06F 11/3636 717/124 |
| 8,806,115 B1 * | 8/2014 | Patel | G06F 3/0659 711/104 |
| 9,280,346 B2 | 3/2016 | Farrell et al. | |
| 9,400,736 B2 | 7/2016 | Gainey, Jr. et al. | |
| 9,436,586 B1 | 9/2016 | Fagen et al. | |
| 9,454,460 B2 * | 9/2016 | Yang | G06F 11/3632 |
| 9,632,914 B2 | 4/2017 | Cheng et al. | |
| 9,898,385 B1 * | 2/2018 | O'Dowd | G06F 11/3664 |
| 10,133,653 B2 | 11/2018 | O'Riordan et al. | |
| 10,248,549 B1 | 4/2019 | Davies | |
| 10,394,998 B2 * | 8/2019 | Cummings | G06F 30/398 |
| 10,540,250 B2 * | 1/2020 | Mola | G06F 11/30 |
| 10,585,796 B2 * | 3/2020 | Daudel | G06F 11/3636 |
| 10,949,332 B2 | 3/2021 | Mola | |
| 11,281,560 B2 | 3/2022 | Mola | |
| 2003/0033511 A1 * | 2/2003 | Akkary | G06F 9/3855 712/E9.05 |
| 2003/0084425 A1 | 5/2003 | Glaser | |
| 2004/0221115 A1 | 11/2004 | Sahin et al. | |
| 2004/0243894 A1 * | 12/2004 | Smith | G06F 11/364 714/724 |
| 2005/0177821 A1 | 8/2005 | Ogata et al. | |
| 2006/0074622 A1 * | 4/2006 | Scott | G06F 11/3692 703/23 |
| 2006/0236074 A1 * | 10/2006 | Williamson | G06F 12/1054 711/E12.063 |
| 2007/0028047 A1 * | 2/2007 | Williamson | G06F 12/0864 711/216 |
| 2007/0083645 A1 * | 4/2007 | Roeck | G06F 11/2028 709/224 |
| 2007/0198676 A1 * | 8/2007 | Vertes | G06F 11/3636 709/223 |
| 2007/0214171 A1 * | 9/2007 | Behnen | G06F 8/60 707/999.102 |
| 2007/0250820 A1 | 10/2007 | Edwards et al. | |
| 2008/0022262 A1 | 1/2008 | Prakash et al. | |
| 2008/0040093 A1 * | 2/2008 | Sargaison | G06F 9/45504 703/28 |
| 2008/0097995 A1 * | 4/2008 | Dias | G06F 16/2379 |
| 2008/0098207 A1 * | 4/2008 | Reid | G06F 11/3636 714/E11.207 |
| 2008/0259844 A1 * | 10/2008 | Richeson | H04M 11/002 370/328 |
| 2008/0282112 A1 * | 11/2008 | Bailey | H04L 43/50 714/38.11 |
| 2008/0301417 A1 * | 12/2008 | Law | G06F 9/3863 714/E11.208 |
| 2009/0133033 A1 * | 5/2009 | Lindo | G06F 11/0778 718/108 |
| 2009/0228871 A1 * | 9/2009 | Edwards | G06F 11/3676 717/128 |
| 2009/0240987 A1 | 9/2009 | Adya et al. | |
| 2009/0248611 A1 * | 10/2009 | Xu | G06F 9/45533 |
| 2010/0251031 A1 * | 9/2010 | Nieh | G06F 11/3476 714/45 |
| 2010/0325359 A1 | 12/2010 | Goel et al. | |
| 2011/0072417 A1 | 3/2011 | Dhurjati et al. | |
| 2011/0264959 A1 * | 10/2011 | Subhraveti | G06F 9/44 714/E11.208 |
| 2012/0084759 A1 | 4/2012 | Candea et al. | |
| 2012/0304010 A1 | 11/2012 | Opstad et al. | |
| 2014/0208004 A1 * | 7/2014 | Cohen | G06F 12/0246 711/103 |
| 2014/0289711 A1 | 9/2014 | Usui | |
| 2014/0298301 A1 * | 10/2014 | Lindahl | G06F 11/364 717/128 |
| 2014/0325336 A1 | 10/2014 | Odenheimer et al. | |
| 2014/0350910 A1 | 11/2014 | Talwadker et al. | |
| 2015/0234730 A1 | 8/2015 | Puthuff et al. | |
| 2016/0147649 A1 | 5/2016 | Magdon-Ismail et al. | |
| 2016/0292061 A1 * | 10/2016 | Marron | G06F 11/3636 |
| 2016/0335172 A1 * | 11/2016 | Smith | G06F 11/36 |
| 2017/0161174 A1 * | 6/2017 | Daudel | G06F 9/45504 |
| 2017/0177367 A1 * | 6/2017 | DeHon | G06F 9/30098 |
| 2017/0286111 A1 | 10/2017 | Pereira et al. | |
| 2018/0004526 A1 | 1/2018 | Lyra | |
| 2018/0032423 A1 * | 2/2018 | Bull | G06F 11/3664 |
| 2018/0060213 A1 * | 3/2018 | Mola | G06F 11/3664 |
| 2018/0060215 A1 * | 3/2018 | Mola | G06F 11/3636 |
| 2018/0074943 A1 | 3/2018 | Williams et al. | |
| 2018/0136869 A1 * | 5/2018 | Mola | G06F 11/30 |
| 2018/0253369 A1 | 9/2018 | O'dowd et al. | |
| 2018/0300228 A1 * | 10/2018 | Beyel, III | G06F 11/3664 |
| 2019/0004843 A1 * | 1/2019 | Durham | G06F 21/53 |
| 2019/0042396 A1 | 2/2019 | Mola | |
| 2019/0147168 A1 | 5/2019 | Kim et al. | |
| 2019/0340103 A1 * | 11/2019 | Nelson | G06F 11/3636 |
| 2020/0012582 A1 | 1/2020 | Sharma | |
| 2020/0301808 A1 | 9/2020 | Mola | |
| 2020/0301809 A1 | 9/2020 | Mola | |
| 2020/0301812 A1 | 9/2020 | Mola | |
| 2020/0301813 A1 | 9/2020 | Mola | |
| 2020/0301815 A1 | 9/2020 | Mola | |
| 2020/0301821 A1 | 9/2020 | Mola | |
| 2021/0049090 A1 | 2/2021 | Mola | |

FOREIGN PATENT DOCUMENTS

| | | |
|---|---|---|
| EP | 20717434.3 | 3/2020 |
| EP | 20750844.1 | 6/2020 |
| IN | 202147039017 | 3/2020 |
| IN | 202147062214 | 6/2020 |
| WO | PCT/US2020/0022206 | 3/2020 |
| WO | PCT/US2020/0022210 | 3/2020 |
| WO | PCT/US2020/0037103 | 6/2020 |

OTHER PUBLICATIONS

Hu, et al., "Fuzzy and Cross-App Replay for Smartphone Apps", In Proceedings of the 11th International Workshop on Automation of Software Test, May 14, 2016, pp. 50-56.

"International Search Report and Written Opinion Issued in PCT Application No. PCT/US20/022206", dated Jul. 6, 2020, 14 Pages.

"International Search Report and Written Opinion Issued in PCT Application No. PCT/US20/022210", dated Jul. 7, 2020, 13 Pages.

Prahofer, et al., "A Comprehensive Solution for Deterministic Replay Debugging of SoftPLC Applications", In Proceedings of

(56) References Cited

OTHER PUBLICATIONS

IEEE Transactions on Industrial Informatics, vol. 7, Issue: 4, Sep. 6, 2011, pp. 641-651.

Schatz, et al., "Analyzing Long-Running Controller Applications for Specification Violations Based on Deterministic Replay", In Proceedings of 38th Euromicro Conference on Software Engineering and Advanced Applications, Sep. 5, 2012, pp. 55-62.

Viennot, et al., "Transparent Mutable Replay for Multicore Debugging and Patch Validation", In Proceedings of ACM SIGARCH Computer Architecture News, Mar. 16, 2013, pp. 127-138.

"Non Final Office Action Issued in U.S. Appl. No. 16/358,221", dated Mar. 30, 2020, 30 Pages.

"Non Final Office Action Issued in U.S. Appl. No. 16/459,899", dated Apr. 17, 2020, 46 Pages.

"Non Final Office Action Issued in U.S. Appl. No. 16/460,113", dated Apr. 22, 2020, 45 Pages.

"Non Final Office Action Issued in U.S. Appl. No. 16/358,194", dated Apr. 20, 2020, 62 Pages.

"Final Office Action Issued in U.S. Appl. No. 16/358,194", dated Oct. 5, 2020, 60 Pages.

"Final Office Action Issued in U.S. Appl. No. 16/358,221", dated Oct. 5, 2020, 42 Pages.

"Final Office Action Issued in U.S. Appl. No. 16/459,899", dated Oct. 5, 2020, 49 Pages.

"Final Office Action Issued in U.S. Appl. No. 16/460,113", dated Oct. 2, 2020, 45 Pages.

"Non Final Office Action Issued in U.S. Appl. No. 16/552,143", dated Nov. 4, 2020, 101 Pages.

"Non Final Office Action Issued in U.S. Appl. No. 16/541,647", dated Nov. 4, 2020, 69 Pages.

"Notice of Allowance Issued in U.S. Appl. No. 16/540,723", dated Nov. 12, 2020, 9 Pages.

"Final Office Action Issued in U.S. Appl. No. 16/552,143", dated May 12, 2021, 90 Pages.

"Final Office Action Issued in U.S. Appl. No. 16/541,647", dated May 12, 2021, 68 Pages.

"Non Final Office Action Issued in U.S. Appl. No. 16/358,221", dated Apr. 2, 2021, 50 Pages.

"Non Final Office Action Issued in U.S. Appl. No. 16/460,113", dated Apr. 30, 2021, 62 Pages.

Krena, et al., "Healing data races on-the-fly", In Proceedings of the ACM workshop on Parallel and distributed systems: testing and debugging, Jul. 9, 2007, pp. 54-64.

Narayanasamy, et al., "Automatically classifying benign and harmful data races using replay analysis", In Proceedings of the Conference on Programming Language Design and Implementation, Jun. 10, 2007, pp. 22-31.

"International Search Report and Written Opinion Issued in PCT Application No. PCT/US20/037103", dated Oct. 8, 2020, 15 Pages.

"Non Final Office Action Issued in U.S. Appl. No. 16/358,194", dated May 19, 2021, 75 Pages.

"Non Final Office Action Issued in U.S. Appl. No. 16/541,647", dated Dec. 15, 2021, 17 Pages.

"Non Final Office Action Issued in U.S. Appl. No. 16/552,143", dated Nov. 30, 2021, 95 Pages.

"Trace Context, W3C", https://www.w3.org/TR/2018/WD-trace-context-20181122/, Nov. 22, 2018, 11 Pages.

"Non-Final Office Action Issued in U.S. Appl. No. 16/459,899", dated Aug. 11, 2021, 79 Pages.

"Non Final Office Action Issued in U.S. Appl. No. 16/358,194", dated Nov. 3, 2021, 79 Pages.

"Final Office Action Issued in U.S. Appl. No. 16/358,221", dated Oct. 20, 2021, 50 Pages.

"Final Office Action Issued in U.S. Appl. No. 16/460,113", dated Nov. 2, 2021, 58 Pages.

"Final Office Action issued in U.S. Appl. No. 16/552,143", dated Jun. 7, 2022, 61 Pages.

U.S. Appl. No. 16/541,647, filed Aug. 15, 2019.
U.S. Appl. No. 16/358,221, filed Mar. 19, 2019.
U.S. Appl. No. 16/460,113, filed Jul. 2, 2019.
U.S. Appl. No. 16/358,194, filed Mar. 19, 2019.
U.S. Appl. No. 16/552,143, filed Aug. 27, 2019.

* cited by examiner

*600a*

|  | VA | Value |
|---|---|---|
| global_array | 0x852c020 | 0x1 |
|  | 0x852c024 | 0x2 |
|  | 0x852c028 | 0x3 |
|  | 0x852c02c | 0x4 |
|  | 0x852c030 | 0x5 |
|  | ... | ... |
| alias_array | 0xe76d4728 | 0x852c020 |

← 601a

|  | VA | Value |
|---|---|---|
| global_array | 0x160d020 | 0x1 |
|  | 0x160d024 | 0x2 |
|  | 0x160d028 | 0x3 |
|  | 0x160d02c | 0x4 |
|  | 0x160d030 | 0x5 |
|  | ... | ... |
| alias_array | 0xe5f3728 | 0x160d020 |

|  | VA | PA | Value |
|---|---|---|---|
| global_array | 0x852c020 | 0xff020 | 0x1 |
|  | 0x852c024 | 0xff024 | 0x2 |
|  | 0x852c028 | 0xff028 | 0x3 |
|  | 0x852c02c | 0xff02c | 0x4 |
|  | 0x852c030 | 0xff030 | 0x5 |
|  | ... | ... | ... |
| alias_array | 0xe76d4728 |  | 0x852c020 |

← 601b

|  | VA | PA | Value |
|---|---|---|---|
| global_array | 0x160d020 | 0xff020 | 0x1 |
|  | 0x160d024 | 0xff024 | 0x2 |
|  | 0x160d028 | 0xff028 | 0x3 |
|  | 0x160d02c | 0xff02c | 0x4 |
|  | 0x160d030 | 0xff030 | 0x5 |
|  | ... | ... | ... |
| alias_array | 0xe5f3728 |  | 0x160d020 |

|  | VA | PA | Value |
|---|---|---|---|
| global_array | 0x852c020 | 0xff020 | 0x2 |
|  | 0x852c024 | 0xff024 | 0x4 |
|  | 0x852c028 | 0xff028 | 0x3 |
|  | 0x852c02c | 0xff02c | 0x4 |
|  | 0x852c030 | 0xff030 | 0x5 |
|  | ... | ... | ... |
| alias_array | 0xe76d4728 |  | 0x852c020 |

601c

|  | VA | PA | Value |
|---|---|---|---|
| global_array | 0x160d020 | 0xaa020 | 0x2 |
|  | 0x160d024 | 0xaa024 | 0x4 |
|  | 0x160d028 | 0xaa028 | 0x3 |
|  | 0x160d02c | 0xaa02c | 0x4 |
|  | 0x160d030 | 0xaa030 | 0x5 |
|  | ... | ... | ... |
| alias_array | 0xe5f3728 |  | 0x160d020 |

|  | VA | PA | Value |
|---|---|---|---|
| foo.Integer | 0x852c018 | 0xff020 | 0x1 |
| foo.Character | 0x852c01c | 0xff024 | 0x41 (A) |
|  | ... | ... | ... |
| bar | 0xe76d4728 |  | 0x852c018 |

701

|  | VA | PA | Value |
|---|---|---|---|
| foo.Character | 0x852c018 | 0xff020 | 0x41 (A) |
| foo.Integer | 0x852c01c | 0xff024 | 0x1 |
|  | ... | ... | ... |
| bar | 0xe76d4728 |  | 0x852c018 |

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 1 | 0 |

⇩

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 0 | 0 | 0 | 0 | 0 | 0 | 0 | 0 | 0 | 0 | 0 | 1 | 0 | 1 | 0 |

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 0 | 1 | 1 | 0 |

⇩

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 1 | 1 | 1 | 1 | 1 | 1 | 1 | 1 | 1 | 1 | 1 | 1 | 0 | 1 | 1 | 0 |

FIG. 10B

INPUT/OUTPUT LOCATION TRANSFORMATIONS WHEN EMULATING NON-TRACED CODE WITH A RECORDED EXECUTION OF TRACED CODE

CROSS-REFERENCE TO RELATED APPLICATIONS

This application is a continuation-in-part of U.S. patent application Ser. No. 16/358,221, filed Mar. 19, 2019 and entitled "EMULATING NON-TRACED CODE WITH A RECORDED EXECUTION OF TRACED CODE," the entire contents of which are incorporated by reference herein in their entirety. This application is also related to U.S. patent application Ser. No. 16/459,899 entitled "INPUT/OUTPUT DATA TRANSFORMATIONS WHEN EMULATING NON-TRACED CODE WITH A RECORDED EXECUTION OF TRACED CODE," and U.S. patent application Ser. No. 16/460,113 entitled "INSTRUCTION SET ARCHITECTURE TRANSFORMATIONS WHEN EMULATING NON-TRACED CODE WITH A RECORDED EXECUTION OF TRACED CODE," both concurrently filed herewith on Jul. 2, 2019.

BACKGROUND

Tracking down and correcting undesired software behaviors is a core activity in software development. Undesired software behaviors can include many things, such as execution crashes, runtime exceptions, slow execution performance, incorrect data results, data corruption, and the like. Undesired software behaviors might be triggered by a vast variety of factors such as data inputs, user inputs, race conditions (e.g., when accessing shared resources), etc. Given the variety of triggers, undesired software behaviors can be rare and seemingly random, and extremely difficult reproduce. As such, it can be very time-consuming and difficult for a developer to identify a given undesired software behavior. Once an undesired software behavior has been identified, it can again be time-consuming and difficult to determine its root cause(s).

Developers have classically used a variety of approaches to identify undesired software behaviors, and to then identify the location(s) in an application's code that cause the undesired software behavior. For example, a developer might test different portions of an application's code against different inputs (e.g., unit testing). As another example, a developer might reason about execution of an application's code in a debugger (e.g., by setting breakpoints/watchpoints, by stepping through lines of code, etc. as the code executes). As another example, a developer might observe code execution behaviors (e.g., timing, coverage) in a profiler. As another example, a developer might insert diagnostic code (e.g., trace statements) into the application's code.

While conventional diagnostic tools (e.g., debuggers, profilers, etc.) have operated on "live" forward-executing code, an emerging form of diagnostic tools enable "historic" debugging (also referred to as "time travel" or "reverse" debugging), in which the execution of at least a portion of a program's thread(s) is recorded into one or more trace files (i.e., a recorded execution). Using some tracing techniques, a recorded execution can contain "bit-accurate" historic trace data, which enables the recorded portion(s) the traced thread(s) to be virtually "replayed," down to the granularity of individual instructions (e.g., machine code instructions, intermediate language code instructions, etc.). Thus, using "bit-accurate" trace data, diagnostic tools can enable developers to reason about a recorded prior execution of subject code, as opposed to a "live" forward execution of that code. For example, a historic debugger might enable both forward and reverse breakpoints/watchpoints, might enable code to be stepped through both forwards and backwards, etc. A historic profiler, on the other hand, might be able to derive code execution behaviors (e.g., timing, coverage) from prior-executed code.

BRIEF SUMMARY

At least some embodiments described herein leverage historic debugging technologies to emulate execution of non-traced code based on trace data from a recorded execution of related traced code. In other words, embodiments can use a recorded execution of first code to guide emulation of second code that was not traced into this recorded execution. In embodiments, the first and second code have differences, but are functionally related. For example, they may be compiled from the same source code using different compilers and/or different compiler settings, or may be compiled from different versions of the same source code project. As will be explained herein, emulating non-traced code with a recorded execution of related traced code can be useful for many useful purposes, such as to identify compiler bugs (e.g., when different compiler flags, compiler versions, or compiler products result in the production of functionally distinct binaries from the same source code), to determine if source code changes address undesired software behaviors and/or introduce new undesired software behaviors, or to enable debugging of non-optimized code based on a trace of optimized code.

In some embodiments methods, systems, and computer program products emulate execution of second executable code using trace data gathered during execution of first executable code. In particular, a replayable recorded execution of a prior execution of first executable code is accessed. The replayable recorded execution includes one or more inputs that were consumed by one or more first executable instructions during the prior execution of the first executable code. Second executable code, which is different than the first executable code, is also accessed. Execution of second executable code is not recorded in the replayable recorded execution. Execution of the second executable code is emulated using the one or more inputs from the replayable recorded execution. Embodiments could report one or more differences between the emulated execution of the second executable code and the prior execution of the first executable code, or equivalency between the emulated execution of the second executable code and the prior execution of the first executable code.

In addition, one or more embodiments are directed to particular transformations that enable trace data gathered during execution of one application to be used to emulate code of another application. For example, one class of transformations allow for changes in a function's ABI and other re-mappings between memory locations, between register locations, or between memory locations and register locations. In embodiments, these transformations can also allow—among other things—for changes in a data structure's internal layout, but where the overall size of the data structure stays the same.

As such, embodiments also include methods, systems, and computer program products that map input locations to enable execution of second executable code using trace data gathered during execution of first executable code. In particular, a replayable recorded execution of a prior execution of first executable code is accessed. The replayable recorded execution stores data of at least one input that was consumed by a first sequence of executable instructions during the prior execution of the first executable code. Second executable code, which is different than the first executable code, is also accessed. Execution of second executable code is not recorded in the replayable recorded execution. It is determined that the stored data of the at least one input is usable as an input to a second sequence of executable instructions of the second executable code. One or more differences between the first sequence of executable instructions and the second sequence of executable instructions are identified, including identifying at least one difference in how the first sequence of executable instructions accessed the at least one input during recording, as compared to how the second sequence of executable instructions expect to access the at least one input. Based on the identified one or more differences, one or more location transformations are determined that would enable the second sequence of executable instructions to access the stored data of the at least one input. Execution of the second sequence of executable instructions is emulated using the stored data of the at least one input. This includes projecting the one or more location transformations to enable the second sequence of executable instructions to access the stored data of the at least one input.

Another class of transformations allow for changes in an input and/or output's size and/or data format, including allowing for changes in pointer sizes. In embodiments, these transformations can also allow—among other things—for superset and subset conversions between an input's data size, conversions from larger pointer sizes to smaller pointer sizes, adapting to data structures having changes in overall data structure size, and the like.

As such, embodiments also include methods, systems, and computer program products that transform input data to enable execution of second executable code using trace data gathered during execution of first executable code. In particular, a replayable recorded execution of a prior execution of first executable code is accessed. The replayable recorded execution stores data of at least one input that was consumed by a first sequence of executable instructions during the prior execution of the first executable code. Second executable code, which is different than the first executable code, is also accessed. Execution of second executable code is not recorded in the replayable recorded execution. It is determined that the stored data of at least one input is usable as an input to a second sequence of executable instructions of the second executable code. One or more differences between the first sequence of executable instructions and the second sequence of executable instructions are identified, including identifying at least one difference in at least one of a size or a format of the stored data of the at least one input as used by the first sequence of executable instructions during recording, as compared to an input size and format expected by the second sequence of executable instructions. Based on the identified one or more differences, one or more data transformations on the stored data of the at least one input are determined that would enable the second sequence of executable instructions to consume the stored data of the at least one input. Execution of the second sequence of executable instructions is emulated using the stored data of the at least one input. This includes projecting the one or more data transformations on the stored data of the at least one input to enable the second sequence of executable instructions to consume the stored data of the at least one input.

Yet another class of transformations allow for the instruction set architecture (ISA) (e.g., x86, x86_64, ARM, MIPS, etc.) to change between traced code and emulated code.

As such, embodiments also include methods, systems, and computer program products that emulate execution of second executable code of a second ISA using trace data gathered during execution of first executable code of a first ISA. In particular, a replayable recorded execution of a prior execution of first executable code of a first ISA is accessed. The replayable recorded execution stores data of at least one input that was consumed by a first sequence of executable instructions of the first ISA during the prior execution of the first executable code. Second executable code of a second ISA is also accessed. The second executable code includes a second sequence of executable instructions of the second ISA. Execution of second executable code is not recorded in the replayable recorded execution. It is determined that the stored data of at least one input used by the first sequence of executable instructions of the first ISA is usable as an input to the second sequence of executable instructions of the second ISA. One or more differences between the first sequence of executable instructions and the second sequence of executable instructions are identified, including identifying at least one difference in at least one of a location, a size, or a format of the stored data of the at least one input compared to input location, size, and format expected by the second sequence of executable instructions. Based on the identified one or more differences, one or more transformations on at least one of the location or the stored data of the at least one input are determined that would enable the second sequence of executable instructions to access and consume the stored data of the at least one input. Using an emulator of the second ISA, execution of the second sequence of executable instructions is emulated using the stored data of the at least one input. This includes projecting the one or more transformations on at least one of the location or the stored data of the at least one input to enable the second sequence of executable instructions to access and consume the stored data of the at least one input.

While the embodiments already discussed focused primarily on transforming inputs, embodiments might transform outputs instead of, or in addition to, inputs. For example, embodiments also include methods, systems, and computer program products that transform outputs based on emulating execution of second executable code using trace data gathered during execution of first executable code. In particular, a replayable recorded execution of a prior execution of first executable code is accessed. The replayable recorded execution includes trace data recording execution of a first sequence of executable instructions during the prior execution of the first executable code. Second executable code, which different from the first executable code, is also accessed. Execution of second executable code is not recorded in the replayable recorded execution. It is determined that a first output of the first sequence of executable instructions in the first executable code maps to a second output of a second sequence of executable instructions in the second executable code. Based at least on the first output mapping to the second output, execution of the second sequence of executable instructions is emulated based at least on the trace data recording the execution of the first sequence of executable instructions. One or more transformations are applied to the second output, which project the second output resulting from emulation of the second sequence of executable instructions onto the first output.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 6A illustrates tables that show possible memory layouts during execution of example code;

FIG. 6B illustrates tables that show possible memory layouts during execution of example code, including physical address mappings;

FIG. 6C illustrates tables that show possible memory layouts during execution of example code, including array element mappings;

FIG. 7 illustrates a table that shows a possible memory layout during execution of example code;

FIG. 10A illustrates an example in which a 32-bit representation of the number 10 is projected into a 16-bit representation;

FIG. 10B illustrates an example in which a 32-bit representation of the number −10 is projected into a 16-bit representation;

DETAILED DESCRIPTION

Figure 1A:
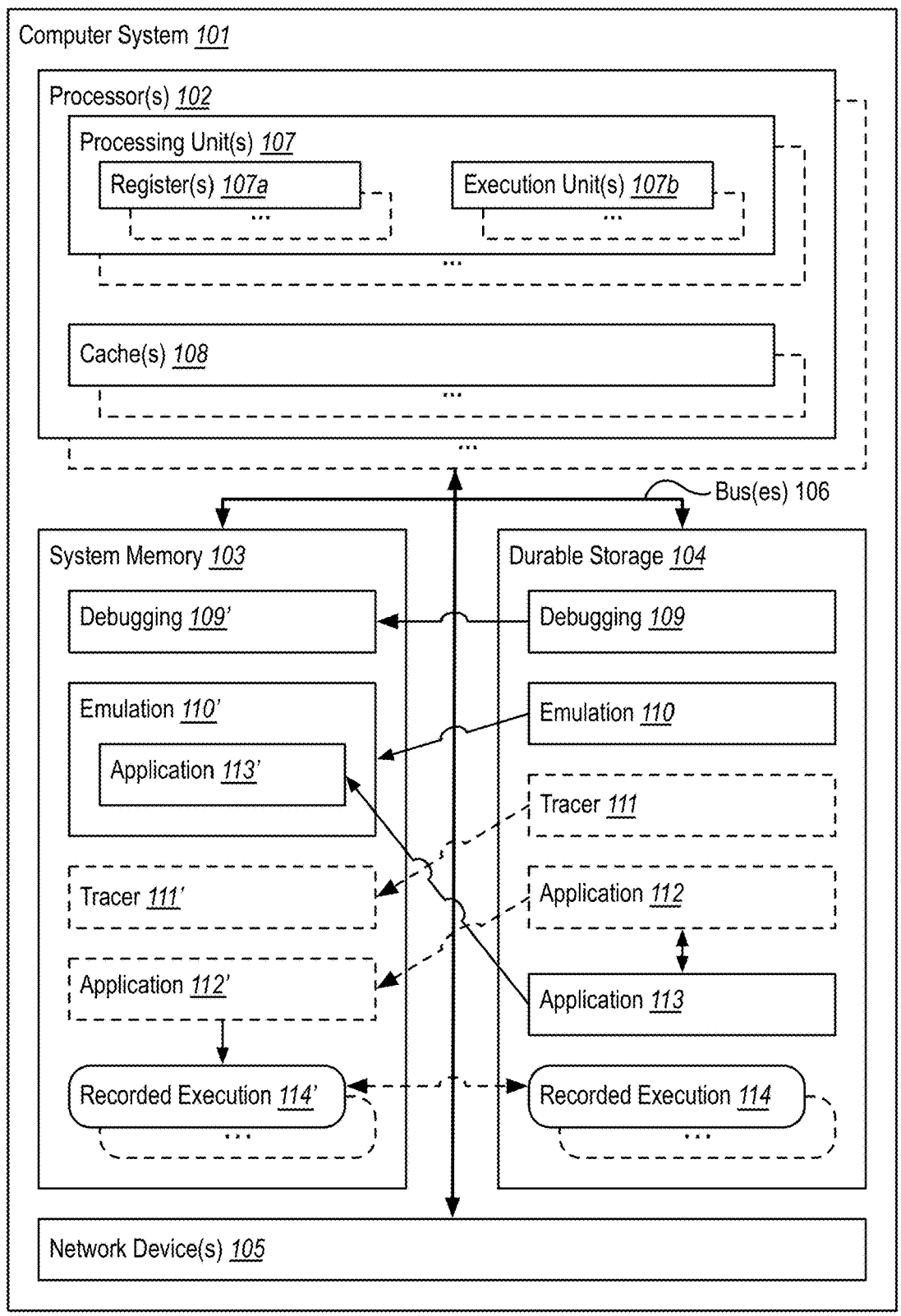
FIG. 1A illustrates an example computing environment that facilitates emulating non-traced code with a recorded execution of related traced code.

At least some embodiments described herein leverage historic debugging technologies to emulate execution of non-traced code based on trace data from a recorded execution of related traced code. In other words, embodiments can use a recorded execution of first code to guide emulation of second code that was not traced into this recorded execution. In embodiments, the first and second code have differences, but are functionally related. For example, they may be compiled from the same source code using different compilers and/or different compiler settings, or may be compiled from different versions of the same source code project. As will be explained herein, emulating non-traced code with a recorded execution of related traced code can be useful for many useful purposes, such as to identify compiler bugs (e.g., when different compiler flags, compiler versions, or compiler products result in the production of functionally distinct binaries from the same source code), to determine if source code changes address undesired software behaviors and/or introduce new undesired software behaviors, or to enable debugging of non-optimized code based on a trace of optimized code.

In addition, one or more embodiments are directed to particular transformations that enable trace data gathered during execution of one application to be used to emulate code of another application. For example, one class of transformations allow for changes in a function's ABI and other re-mappings between memory locations, between register locations, or between memory locations and register locations. In embodiments, these transformations can also allow—among other things—for changes in a data structure's internal layout, but where the overall size of the data structure stays the same. Another class of transformations allow for changes in an input and/or output's size and/or data format, including allowing for changes in pointer sizes. In embodiments, these transformations can also allow—among other things—for superset and subset conversions between an input's data size, conversions from larger pointer sizes to smaller pointer sizes, adapting to data structures having changes in overall data structure size, and the like. Yet another class of transformations allow for the instruction set architecture (ISA) (e.g., x86, x86_64, ARM, MIPS, etc.) to change between traced code and emulated code.

As indicated, the embodiments herein operate on recorded executions of executable entities. In this description, and in the following claims, a "recorded execution," can refer to any data that stores a record of a prior execution of code instruction(s), or that can be used to at least partially reconstruct the prior execution of the prior-executed code instruction(s). In general, these code instructions are part of an executable entity, and execute on physical or virtual processor(s) as threads and/or processes (e.g., as machine code instructions), or execute in a managed runtime (e.g., as intermediate language code instructions).

A recorded execution used by the embodiments herein might be generated by a variety of historic debugging technologies. In general, historic debugging technologies record or reconstruct the execution state of an entity at various times, in order to enable execution of that entity to be at least partially emulated later from that execution state. The fidelity of that virtual execution varies depending on what recorded execution state is available.

For example, one class of historic debugging technologies, referred to herein as time-travel debugging, continuously records a bit-accurate trace of an entity's execution. This bit-accurate trace can then be used later to faithfully replay that entity's prior execution down to the fidelity of individual code instructions. For example, a bit-accurate trace might record information sufficient to reproduce initial processor state for at least one point in a thread's prior execution (e.g., by recording a snapshot of processor registers), along with the data values that were read by the thread's instructions as they executed after that point in time (e.g., the memory reads). This bit-accurate trace can then be used to replay execution of the thread's code instructions (starting with the initial processor state) based on supplying the instructions with the recorded reads.

Another class of historic debugging technology, referred to herein as branch trace debugging, relies on reconstructing at least part of an entity's execution state based on working backwards from a dump or snapshot (e.g., a crash dump of a thread) that includes a processor branch trace (i.e., which includes a record of whether or not branches were taken). These technologies start with values (e.g., memory and register) from this dump or snapshot and, using the branch trace to at least partially determine code execution flow, iteratively replay the entity's code instructions and backwards and forwards in order to reconstruct intermediary data values (e.g., register and memory) used by this code until those values reach a steady state. These techniques may be limited in how far back they can reconstruct data values, and how many data values can be reconstructed. Nonetheless, the reconstructed historical execution data can be used for historic debugging.

Yet another class of historic debugging technology, referred to herein as replay and snapshot debugging, periodically records full snapshots of an entity's memory space and processor registers while it executes. If the entity relies on data from sources other than the entity's own memory, or from a non-deterministic source, these technologies might also record such data along with the snapshots. These technologies then use the data in the snapshots to replay the execution of the entity's code between snapshots.

FIG. 1A illustrates an example computing environment 100a that facilitates emulating non-traced code with a recorded execution of related traced code. As depicted, computing environment 100a may comprise or utilize a special-purpose or general-purpose computer system 101, which includes computer hardware, such as, for example, one or more processors 102, system memory 103, durable storage 104, and/or network device(s) 105, which are communicatively coupled using one or more communications buses 106.

Embodiments within the scope of the present invention can include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media (e.g., system memory 103 and/or durable storage 104) that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., network device(s) 105), and then eventually transferred to computer system RAM (e.g., system memory 103) and/or to less volatile computer storage media (e.g., durable storage 104) at the computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, machine code instructions (e.g., binaries), intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

As shown in FIG. 1A, each processor 102 can include (among other things) one or more processing units 107 (e.g., processor cores) and one or more caches 108. Each processing unit 107 loads and executes machine code instructions via the caches 108. During execution of these machine code instructions at one more execution units 107b, the instructions can use internal processor registers 107a as temporary storage locations, and can read and write to various locations in system memory 103 via the caches 108. In general, the caches 108 temporarily cache portions of system memory 103; for example, caches 108 might include a "code" portion that caches portions of system memory 103 storing application code, and a "data" portion that caches portions of system memory 103 storing application runtime data. If a processing unit 107 requires data (e.g., code or application runtime data) not already stored in the caches 108, then the processing unit 107 can initiate a "cache miss," causing the needed data to be fetched from system memory 103—while potentially "evicting" some other data from the caches 108 back to system memory 103.

As illustrated, the durable storage 104 can store computer-executable instructions and/or data structures representing executable software components; correspondingly, during execution of this software at the processor(s) 102, one or more portions of these computer-executable instructions and/or data structures can be loaded into system memory 103. For example, the durable storage 104 is shown as storing computer-executable instructions and/or data structures corresponding to a debugging component 109, an emulation component 110, and an application 113, as well as one or more recorded executions 114 (e.g., generated using one or more of the historic debugging technologies described above).

In general, the debugging component 109 leverages the emulation component 110 in order to emulate execution of code of application 113 based on execution state data obtained from one or more of the recorded executions 114. Thus, FIG. 1A shows that the debugging component 109 and the emulation component 110 are loaded into system memory 103 (i.e., debugging component 109' and emulation component 110'), and that the application 113 being emulated within the emulation component 110' (i.e., application 113').

The durable storage 104 and system memory 103 are also shown as potentially storing computer-executable instructions and/or data corresponding to a tracer component 111 and an application 112. These components are shown in broken lines because they may exist at some other computer system rather than computer system 101 (though they could also exist at the other computer system(s) in addition to computer system 101). In general, the tracer component 111 records or traces prior execution(s) of application 112 into the recorded execution(s) 114 (e.g., using one or more types of the historic debugging technologies described above). For example, if computer system 101 includes the tracer component 111 and the application 112, these components can be loaded into system memory 103 (i.e., tracer component 111' and application 112'); then, as indicated by the arrow between application 112' and recorded execution 114', the tracer component 111' can record execution of application 112' at the processor(s) 102 into recorded execution 114' (which might then be persisted to the durable storage 104 as recorded execution 114).

Figure 2:
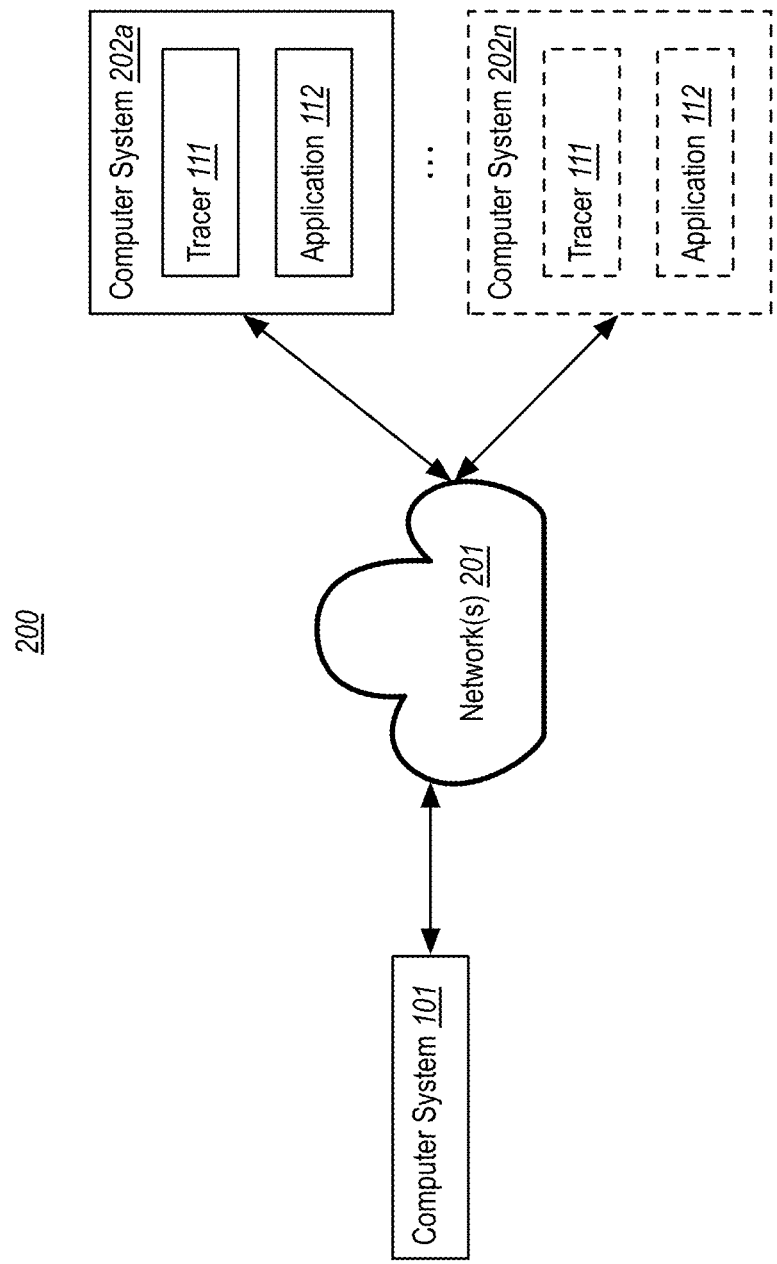
FIG. 2 illustrates an example computing environment in which the computer system of FIG. 1A is connected to one or more other computer systems over one or more networks.

Alternatively, computer system 101 could receive one or more of the recorded executions 114 from another computer system (e.g., using network device(s) 105). For example, FIG. 2 illustrates an example computing environment 200 in which computer system 101 of FIG. 1A is connected to one or more other computer systems 202 (i.e., 202a-202n) over one or more networks 201. As shown, in example 200 each computer system 202 includes a tracer component 111 and a copy of application 112. As such, computer system 101 may receive one or more recorded execution(s) 114 of application 112 from these computer system(s) 202 over the network(s) 201.

Returning to FIG. 1A, as indicated by the arrow between application 112 and 113, these applications can be functionally related. For example, application 112 and 113 might be functionally related because they were compiled from identical source code, but with different compiler settings. For instance, application 112 might be a build that has one or more compiler optimization flags enabled (e.g., a "production build"), while application 113 might be a build that has these compiler optimization flag(s) disabled (e.g., a "debug" build). Additionally, or alternatively, application 112 might be compiled with one version of a compiler, while application 113 is compiled with another version of the compiler. Additionally, or alternatively, application 112 and application 113 might compiled with different compiler products altogether. As another example, application 112 and 113 might be functionally related because they were compiled from different versions of the same code. For instance, application 112 might be built from one version of source code, while application 113 is built from a more recent version of the source code that includes fixes, such as bug fixes and/or performance improvements.

It is noted that, while the debugging component 109, the emulation component 110, and/or the tracer component 111 might each be independent components or applications, they might alternatively be integrated into the same application (such as a debugging suite), or might be integrated into another software component—such as an operating system component, a hypervisor, a cloud fabric, etc. As such, those skilled in the art will also appreciate that the invention may be practiced in a cloud computing environment of which computer system 101 is a part.

It was mentioned previously that the debugging component 109 leverages the emulation component 110 in order to emulate execution of code of application 113 using execution state data from one or more of the recorded executions 114. However, as also discussed, in embodiments recorded executions 114 may correspond to a prior execution of application 112 (rather than application 113). As such, in accordance with the embodiments herein, the debugging component 109 can use execution state data relating to a prior execution of application 112 in order to guide emulation of executable code corresponding to application 113 (rather than application 112). Thus, the debugging component 109 can effectively use the emulation component 110 to guide emulation of non-traced code (i.e., application 113) based on a recorded execution (i.e., recorded execution 114) of related traced code (i.e., application 112).

As will be appreciated in view of the disclosure herein, emulating non-traced code with a recorded execution of related traced code can be useful for many debugging purposes. For example, it can be used to detect/identify bugs or differences in compilers. For instance, if application 112 and application 113 were both compiled from the same source code, but with different compiler products, different compiler settings, and/or different compiler versions, application 112 and application 113 should both exhibit equivalent behaviors during their execution. However, if emulation of application 113 based on recorded executions 114 produces different results than application 112 produced during its recorded execution, there is evidence of compiler bugs (or, at least, functional differences between compiler products or versions).

In another example, emulating non-traced code with a recorded execution of related traced code can be useful to test source code changes that should make only performance improvements. For instance, if application 113 is compiled from a version of source code that includes only performance improvements as compared to a version of source code from which application 112 was compiled, then application 113 should exhibit equivalent behaviors as application 112 when it is being emulated using trace data gathered during execution of application 112; if there is a difference, then the performance improvements caused behavioral changes that may have introduced bug(s)/regression(s).

In another example, emulating non-traced code with a recorded execution of related traced code can be useful to test source code changes that should make only bug fixes. For instance, suppose that recorded executions 114 include ten recorded executions of application 112, two of which exhibit some undesired behavior (e.g., bug). If application 113 was compiled from a version of source code that includes a fix for this bug, then application 113 should not exhibit the undesired behavior when being emulated using the two recorded executions during which application 112 exhibited the undesired behavior; otherwise, the bug was probably not fixed. Additionally, application 113 should exhibit equivalent behaviors as application 112 when it is being emulated using the other eight recorded executions; otherwise, the bug fix probably introduced new bug(s)/regression(s).

In another example, emulating non-traced code with a recorded execution 114 of related traced code can be used to debug the recorded execution 114 using non-optimized code, based on trace data that was captured during execution of optimized code. As will be appreciated by those of skill in that art, it can be difficult for a human user to reason about execution of code that was compiled with compiler optimizations enabled. For instance, when visualizing execution of optimized code in a debugger, the executed code flow may not appear to correspond to the expected code flow of the source code that the human user interacts with. Thus, for example, application 112 may be a compiler-optimized "production" build that is in active use, with its execution being traced into recorded execution 114. Because application 112 comprises optimized code, it may be difficult for a human user to reason about the execution behaviors that are traced into recorded execution 114 (e.g., if the debugging component 109 caused application 112 to be emulated using recorded execution 114). However, embodiments might use trace data in this recorded execution 114 to emulate execution of application 113, which might be a "debug" build that was compiled without optimizations settings enabled—making it much easier for a human user to reason about the execution behaviors that are traced into recorded execution 114.

Figure 1B:
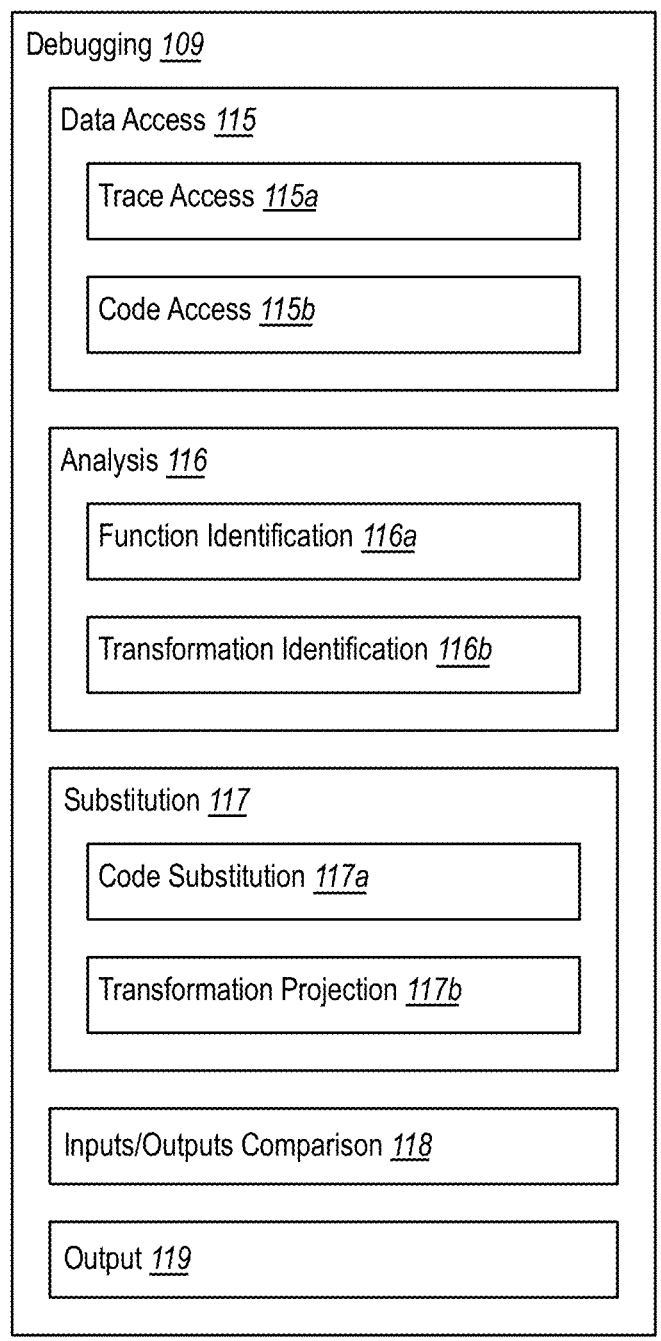
FIG. 1B illustrates an example debugging component.

To demonstrate how the debugging component 109 might accomplish emulation of non-traced code (e.g., application 113) with a recorded execution of related traced code (e.g., application 112), FIG. 1B illustrates an example 100*b* that provides additional detail of the debugging component 109 of FIG. 1A. The depicted debugging component 109 includes a variety of components (e.g., data access 115, analysis 116, substitution 117, inputs/outputs comparison 118, output 119, etc.) that represent various functionality the debugging component 109 might implement in accordance with various embodiments described herein. It will be appreciated that the depicted components—including their identity, sub-components, and arrangement—are presented merely as an aid in describing various embodiments of the debugging component 109 described herein, and that these components are non-limiting to how software and/or hardware might implement various embodiments of the debugging component 109 described herein, or of the particular functionality thereof.

Figure 3:
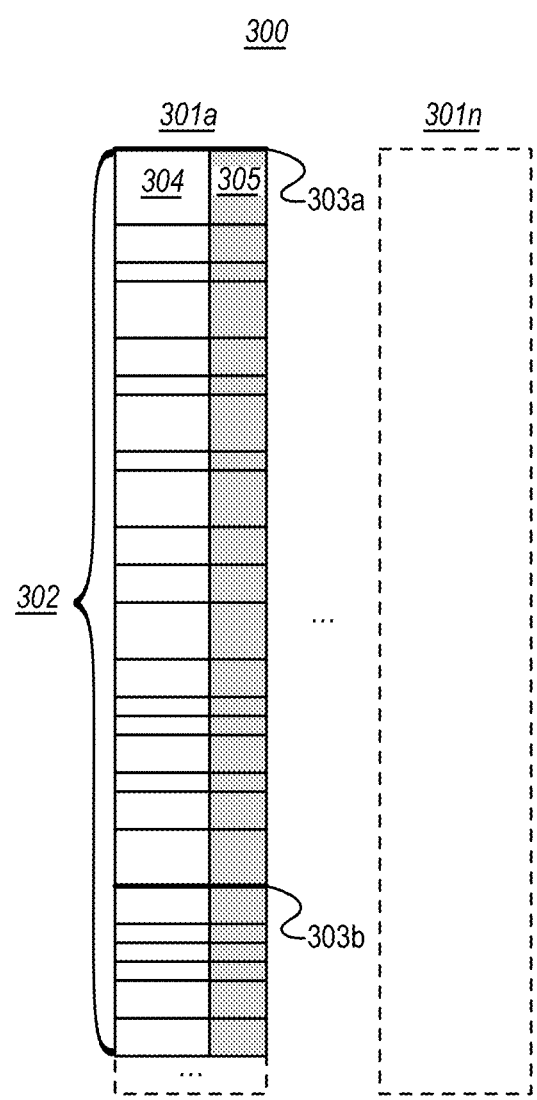
FIG. 3 illustrates an example of a recorded execution.

The data access component 115 includes a trace access sub-component 115*a* and a code access sub-component 115*b*. The trace access sub-component 115*a* accesses recorded executions, such a recorded execution 114 of a prior execution of application 112. FIG. 3 illustrates one example of a recorded execution 300 that might be accessed by the trace access sub-component 115a, where the recorded execution 300 might have been generated using time-travel debugging technology.

In the example of FIG. 3, recorded execution 300 includes a plurality of data streams 301 (i.e., 301a-301n). In embodiments, each data stream 301 records execution of a different thread that executed from the code of application 112. For example, data stream 301a might record execution of a first thread of application 112, while data stream 301n records an $n^{th}$ thread of application 112. As shown, data stream 301a comprises a plurality of data packets 302. Since the particular data logged in each data packet 302 might vary, they are shown as having varying sizes. In general, when using time-travel debugging technologies, each data packet 302 records at least the inputs (e.g., register values, memory values, etc.) to one or more executable instructions that executed as part of this first thread of application 112. As shown, data stream 301a might also include one or more key frames 303 (e.g., 303a, 303b) that each records sufficient information, such as a snapshot of register and/or memory values, that enables the prior execution of the thread to be replayed by the emulation component 110 starting at the point of the key frame forwards.

In embodiments, a recorded execution 114 might include the actual code that was executed. Thus, in FIG. 3, each data packet 302 is shown as including a non-shaded data inputs portion 304 and a shaded code portion 305. In embodiments, the code portion 305 of each data packet 302 might include the executable instructions that executed based on the corresponding data inputs. In other embodiments, however, a recorded execution 114 might omit the actual code that was executed, instead relying on having separate access to the code of application 112 (e.g., from durable storage 104). In these other embodiments, each data packet may, for example, specify an address or offset to the appropriate executable instruction(s).

Returning to FIG. 1B, the code access sub-component 115b of the data access component 115 obtains the code of both application 112 and application 113. If the recorded execution 114 that was obtained by the trace access sub-component 115a included the code of application 112 (e.g., code portion 305), then the code access sub-component 115b might extract the code of application 112 from the recorded execution 114. Alternatively, the code access sub-component 115b might obtain the code of application 112 from the durable storage 104. In either case, the code access sub-component 115b can obtain the code of application 113 from the durable storage 104.

Based on the code accessed by the code access sub-component 115b, the analysis component 116 identifies mappings between different code sections in applications 112 and 113, which mappings are usable to emulate the code of application 113 using the execution state data recorded in recorded execution 114 during execution of application 112 (e.g., the data inputs portions 304 of data packets 302). As shown, for example, the analysis component 116 includes a function identification sub-component 116a. The function identification sub-component 116a identifies mappings between corresponding "functions" in the code of applications 112 and 113, based on identifying inputs and outputs to those functions.

Figure 4:
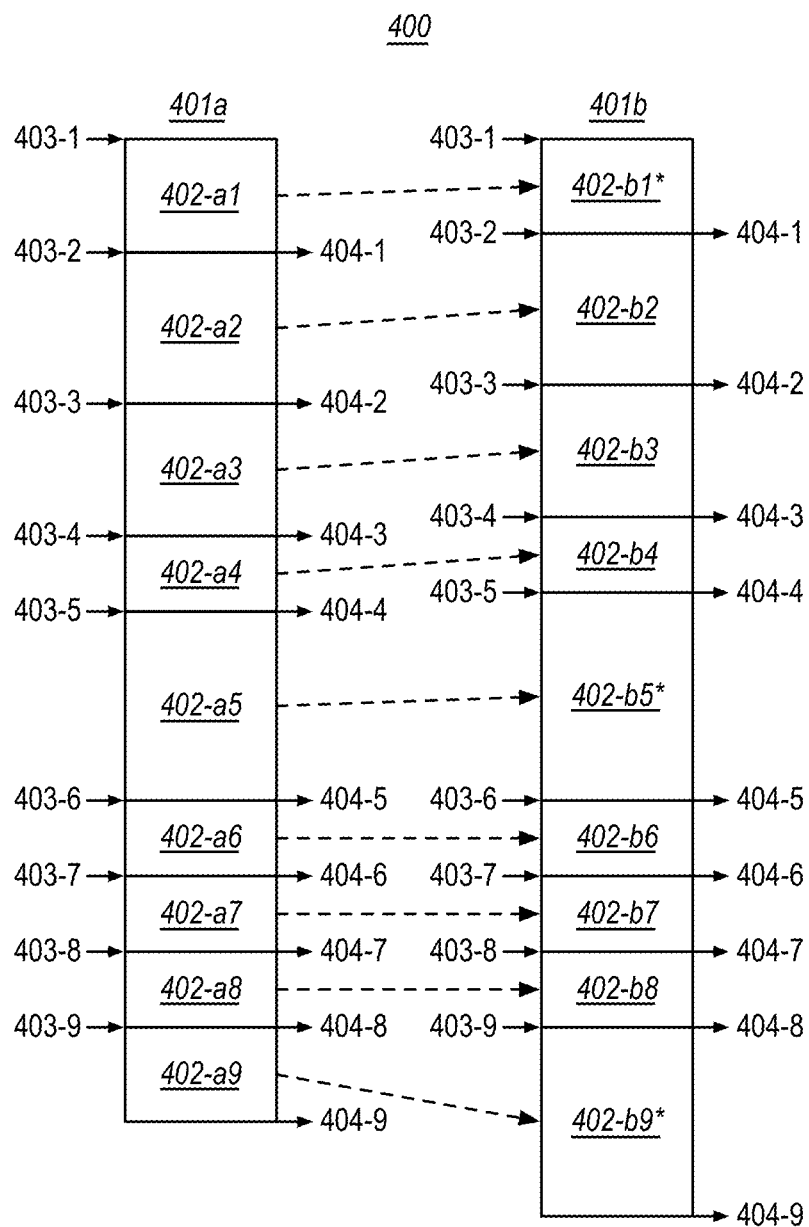
FIG. 4 illustrates an example of mappings between corresponding functions in the code of two applications, in which the functions are identified based on their inputs and outputs.

For example, FIG. 4 illustrates an example 400 of mappings between corresponding "functions" in the code of applications 112 and 113, in which the functions are identified based on their inputs and outputs. In particular, FIG. 4 shows a representation 401a of code of application 112, as well as a representation 401b of code of application 113. FIG. 4 also shows that there is correspondence between different chunks of code (functions) in the two representations 401. For example, function 402-a1 in representation 401a corresponds to function 402-b1 in representation 401b, function 402-a2 in representation 401a corresponds to function 402-b2 in representation 401b, and so on. Notably, while, for clarity, there is a linear correspondence between identified functions, this need not be the case. For instance, in an alternative mapping it might be that function 402-a9 corresponds to function 402-b1 and that function 402-a1 corresponds to function 402-b9, such that an arrow between functions 402-a9 and 402-b1 would cross an arrow between functions 402-a1 and 402-b9.

As used herein, a "function" is defined as a collection of one or more sections of execution, each section comprising a chunk of one or more executable instructions that has zero or more "inputs" and one or more "outputs." A function in the code of application 112 can map to a corresponding function in the code of application 113 if these functions both read from the same input(s) and write to the same output(s), even if the code in those functions is not identical. For example, in FIG. 4, each function 402 has a corresponding set of input(s) 403 and a corresponding set of output(s) 404. Function 402-a1 in application 112, for instance, has a set of input(s) 403-1 and a set of outputs 404-1, function 402-a2 in application 112 has a set of input(s) 403-2 and a set of outputs 404-2, etc. As shown, corresponding functions between applications 112 and 113 have the same sets of inputs and outputs. For example, function 402-b1 in application 113 has the same sets of inputs and outputs (i.e., inputs 403-1 and outputs 404-1) as function 402-a1 in application 112, function 402-b2 in application 113 has the same sets of inputs and outputs (i.e., inputs 403-2 and outputs 404-2) as function 402-a2 in application 112, etc. Generally, the function identification sub-component 116a attempts to map functions that are closely related in behavior.

As used herein, an "input" is defined as any data location from which a function (as defined above) reads, and to which the function itself has not written prior to the read. These data locations could include, for example, registers as they existed the time the function was entered, and/or any memory location from which the function reads and which it did not itself allocate. An edge case may arise if a function allocates memory and then reads from that memory prior to initializing it. In these instances, embodiments might either treat the read to uninitialized memory as an input, or as a bug. As used herein, an "output" is defined as any data location (e.g., register and/or memory location) to which the function writes that it does not later deallocate. For example, a stack allocation at function entry, followed by a write to the allocated area, followed by a stack deallocation at function exit, would not be considered a function output.

In embodiments, the function identification component 116a might rely a known application binary interface (ABI) of the operating system and processor ISA for which application(s) 112/113 are compiled in order to know which register(s) are input(s) to a function and/or which register(s) are output(s) from a function—reducing the need to track registers individually. Thus, for instance, instead of tracking registers individually, the function identification component 116a might use an ABI for which application(s) 112/113 were compiled to determine which register(s) the application(s) 112/113 use to pass parameters to functions, and/or which register(s) the application(s) 112/113 use for return values. In embodiments, debugging symbols might be used to complement, or replace ABI information. Notably, even if calling function ignores the return value of a called function, an ABI and/or symbols may still be usable to determine if the contents of a register used to store the called function's return value have changed.

As mentioned, a given function might be a collection of one or more sections of one or more executable instructions. At times, it might take a plurality of sections in order to identify functions that cleanly map from one application to another. For example, it may by that a particular section might be identifiable in one application (e.g., application 112) that does not cleanly map to the other application (e.g., application 113). As such, this section, itself, would be a poor choice for a "function" that maps between applications (i.e., having the same inputs and outputs, and doing equivalent work). Even if compiled from identical source code, such differences could arise due to compiler optimization settings, in which code in application 113 is transformed by a compiler in a way that does not directly map to application 112. For instance, while a distinct section of code (with defined sets of inputs and outputs) may be identifiable in application 112 (e.g., non-optimized code), it might be optimized away entirely in application 113 (e.g., optimized code). Alternatively, while a first section of code in application 112 might have a common sets of inputs and outputs with a second section of code in application 113, the first section of code in application 112 might do some work that has been optimized out of the second section of code in application 113 and placed into a third section of code in application 113; for example, some work may have been lifted out of a loop. Thus, in order to facilitate clean function mappings between these two applications, a given "function" that is identified as mapping to another application might actually be a collection of a plurality of sections. For instance, in the examples above of a compiler optimizing code away entirely in application 113, or of a compiler moving work from the second chunk of code in application 113 to the third chunk of code in application 113, it might actually take combining two (or more) sections in one or both of applications 112 and 113 in order to arrive at common functions between applications 112 and 113 that have mappable sets of inputs and outputs, and that do equivalent work.

In embodiments, when defining a function as a collection of sections, this can be done inclusively, exclusively, or somewhere in-between. For example, suppose that the function identification sub-component 116a can identify three sections—A, B, and C—in application 112, in which section A called section B, and in which section B called section C during the traced execution. In this situation, a single "function" in application 112 (and that maps with application 113) might be defined as the sum of the chunks of code in sections A, B, and C (i.e., inclusive of everything section A called during the traced execution). Alternatively, a single "function" for mapping with application 113 might be defined as the chunk of code in section A only (i.e., exclusive of section function A called during the traced execution). Alternatively again, a single "function" for mapping with application 113 might be defined as the sum of the chunks of code in sections A and B, but not section C (i.e., partially inclusive and partially exclusive).

In embodiments, it is possible for the function identification component 116a to define and map functions that include sequences of instructions that have one or more gaps within their execution. For example, a function might include a sequence of instructions that make a kernel call—which is not recorded—in the middle of their execution. To illustrate, function 402-a1 might take as inputs a file handle and a character, and include instructions that compare each byte of the file with the input character to find occurrences of the character in the file. Because they rely on file data, these instructions might make one or more kernel calls to read the file (e.g., using the handle as a parameter to the kernel call). This function 402-a1 (with its gap(s)) might then be mapped to function 402-b1—which could be an alternate implementation/compilation of those instructions, with their own gap(s). In order to identify/map functions with gaps, the function identification component 116a may need to ensure that these gaps are properly ordered in each of functions 402-a1 and 402-b1 with respect to the comparison operations, so the file data is processed in the same order in each of functions 402-a1 and 402-b1. Since the sets of inputs 403-a and outputs 404-1 of functions 402-a1 and 402-b1 do not change, any differences would be internal to the functions, and these differences (e.g. different local data structures) are eventually deallocated (e.g., stack popping being a deallocation) so the differences don't affect the outputs of the functions. It is noted that, in embodiments, any register values changed by a kernel call are tracked in the recorded execution(s) 113. Nonetheless, the function identification component 115a might additionally, or alternatively, use an ABI and/or debugging symbols to track which registers values are retained across a kernel call. For instance, the stack pointer (i.e., ESP on x85 or R13 on ARM) is retained across kernel calls.

In embodiments, inputs and outputs are composable. For example, if a single function in application 112 is inclusively defined as the entirety of the code in sections A, B, and C, then this function's set of inputs might be defined as an input set including the combination of each of the inputs of sections A, B, And C, and its set of outputs might be defined as an output set including the combination of each of the outputs of sections A, B, and C. It will be appreciated that when an input (or output) to section B is allocated by (or de-allocated by) section A, or if it is allocated by section B and de-allocated by section A, then that input (or output) to section B may be omitted from the input set (or output set). It will also be appreciated that any input (or output) of a section called within a broader function (i.e., that includes the section), and which is not an input (or output) of the broader function may be omitted from an input set (or output set) for the broader function, or may otherwise be tracked as internal to the broader function.

Complications might also arise due to function inlining, particularly when a child function is not going to be analyzed by the debugging component 109 (e.g., because it comes from a third-party library). For instance, suppose that a first section (A1) of function A executes prior to calling child function B, and then a second section (A2) of function A executes after function B returns. Here, sections A1 and A2 might be treated as independent functions, themselves, with their own sets of inputs and outputs. If function B takes as inputs any of the outputs of A1, those outputs need to be produced before calling into function B; similarly, if function A2 takes as inputs any of the outputs of function B, then those outputs need to appear after the invocation of function B.

In the context of these definitions, if a given chunk of executable instructions that make up a function are deterministic, they should always produce the same data values in their outputs when given the same data values in their inputs. If this chunk of executable instructions is transformed in a way that is functionally equivalent (e.g., due to compiler optimizations, due to variances in compilers, and/ or due to source code transformations that fix bugs or improve performance without altering behavior of the function as a whole), they should still produce these same output data values when given these same input data values.

For example, in FIG. 4, functions 402-*b*1, 402-*b*5, and 402-*b*9 in representation 401*b* of application 113 are shown with asterisks, indicating that the executable instructions in these functions have been transformed as compared to their corresponding functions (i.e., 402-*a*1, 402-*a*5, and 402-*a*9) in representation 401*a* of application 112. In embodiments, these transformations may be the result of application 113 being compiled with different compiler flags, or with a different compiler version or compiler type as compared with application 112, that resulted in different executable instructions being generated for functions 402-*b*1, 402-*b*5, and 402-*b*9 than functions 402-*a*1, 402-*a*5, and 402-*a*9. Additionally, or alternatively, in embodiments, these transformations may be the result of application 113 being compiled from modified source code that includes fixes or improvements that resulted in different executable instructions being generated for functions 402-*b*1, 402-*b*5, and 402-*b*9 than functions 402-*a*1, 402-*a*5, and 402-*a*9.

Notably, a chunk of executable instructions might include one or more individual instructions that are known to be non-deterministic. For instance, the x86 rtdsc instruction returns a time stamp counter (TSC), when called. Thus, each time the rtdsc instruction is called, it returns a different value that is not easily predicted prior to its call. In embodiments, the debugging component 109 is capable of identifying and dealing with some known non-deterministic instructions, thereby being able to consider two corresponding functions (e.g., functions 402-*a*1 and 402-*b*1) deterministic, even if they contain non-deterministic instructions. For instance, in addition to inputs to various instructions, a recorded execution 114 might also store the "side effects" (including outputs) of non-deterministic instructions. Thus, if a non-deterministic instruction appears the same number of times in corresponding functions (e.g., 402-*a*1 and 402-*b*1), the emulation component 110 might emulate these non-deterministic instructions returning the recorded side-effects. Alternatively, the emulation component 110 might produce a fictitious, but heuristically-valid value for the non-deterministic instruction. For instance, for the rtdsc instruction a heuristically-valid value could be a value that is greater than a value returned the last time the instruction was called in the recorded execution, but less than a value returned a next time the instruction was called in the recorded execution. Of course, the emulation component 110 could also refuse to perform an emulation of a non-deterministic instruction.

The debugging component 109 might also deal with complexities that could arise due to reads/writes to memory-mapped hardware registers. For instance, it may be that function 402-*a*1 accesses a register at one address via a hardware memory-mapped register in a first hardware environment, while function 402-*b*1 accesses the register at another address in a second hardware environment (e.g., because it is not memory-mapped to the first memory address in the second hardware environment). In embodiments, the emulation component 110 may recognize that the read in function 402-*b*1 corresponds to the read in function 402-*a*1, even though they are to different addresses, and uses a recorded execution 114 to return a recorded value that was read from the memory-mapped register by function 402-*a*1 when emulating the read from the non-memory-mapped register in function 402-*b*1.

As was mentioned, the function identification sub-component 116*a* maps internal functions between applications 112 and 113 that share the same inputs and the same outputs, and that may contain executable instructions that—while different—are functionally equivalent. If these applications were compiled by the same compiler and against the same ABI/ISA, and if data locations did not change between applications 112 and 113, the trace data stored in a recorded execution 114 that represents a prior execution of a given function in application 112 might be able to be used directly when executing a corresponding mapped function in application 113. However, these conditions may not always be true, and the analysis component 116 may therefore identify one or more data transformations that enable a function in application 113 to be emulated using trace data obtained from execution of a corresponding function in application 112. Thus, as shown, the analysis component 116 also includes a transformation identification sub-component 116*b*, which can identify, for each function mapping, zero or more transformations that enable a function in application 113 to be emulated using trace data obtained from execution of a corresponding function in application 112.

Based on the functions 402 (including inputs 403 and outputs 404) identified by the analysis component 116 (including function mappings identified by the function identification sub-component 116*a* and any data transformations identified by the transformation identification sub-component 116*b*), the substitution component 117 uses the emulation component 110 to "replay" recorded execution 114, while substituting the code of application 112 with the code of application 113. For example, suppose that recorded execution 114 includes execution state data relating to a prior execution of function 402-*a*1 during execution of application 112. Typically, to replay this prior execution of the executable instructions of function 402-*a*1, the emulation component 110 would use recorded data inputs (e.g., the data inputs portion 304 of data packets 302) to provide data values, as needed, to data locations corresponding to the inputs 403-1 that were consumed by the executable instructions of function 402-*a*1. The emulation component 110 would then emulate these instruction's execution using these data values, in order to produce data values in the data locations corresponding to outputs 404-1.

In embodiments, however, rather than using the executable instructions of function 402-*a*1 from application 112, a code substitution sub-component 117*a* causes the emulation component 110 to use these same recorded data inputs to provide data values, as needed, during emulation of the executable instructions of function 402-*b*1 from application 113. If needed, the transformation projection sub-component 117*b* can "project" one or more of the data transformations identified by the transformation identification sub-component 116*b* into the emulated execution context of function 402-*b*1. This process can be repeated for any of functions 402-*b*1 to 402-*b*9.

There can be a variety of transformations that are identified by the transformation identification sub-component 116*b*, and that are projected by the transformation projection sub-component 117*b* in order to facilitate emulation of a "new" function in application 113 (e.g., function 402-*b*1) using trace data gathered during execution of a corresponding "old" function in application 112 (e.g., function 402-*a*1). For example, some transformations might re-map the memory location(s) storing inputs used by an old function to memory location(s) that are expected by the new function.

For instance, one or more transformations might adapt to changes in a first ABI used by an old function in application 112 and a second ABI used by a new function in application 113. For example, the first ABI might expect a function's inputs and/or outputs to be on the stack, while the second ABI might expect them to be in registers (or vice versa). These ABI differences could arise, for example, due to the compiler or compiler settings used to compile each application. To illustrate, even on the same processor ISA, one compiler (or compiler setting) might generate code that passes a value to a function using a stack memory location, while another compiler (or compiler setting) might generate code that passes the same value to the function using a register. Additionally, as discussed below, embodiments might even be able to permit changes in ISA between the new and old functions (e.g., x86 to ARM). In these cases, the ISA change might result in parameters being passed via register instead of the stack, and the entire set of registers may change. As such, in order for the new function to utilize the trace data, a transformation may map a memory location to a register, may map a register to a memory location, and/or may map one register to another register.

Additionally, or alternatively, one or more transformations might adapt to changes in the internal structure of a data structure that is expected by the new function (e.g., when the arrangement of internal data elements changes, but the overall size of the data structure stays the same). For instance, an old function might receive as an input a struct or a class that has a different internal layout than the struct or class received by the new function. To illustrate, an old function might receive as an input a struct having the following definition:

```
struct Foo {
    int field1;
    char field2;
};
```

A new function, on the other hand, might receive as an input a struct have the following definition, which swaps the position of the two internal members:

```
struct Foo {
    char field2
    int field1;
};
```

Because the internal layout of the data structure has changed, the new function will expect to find each of the members at different memory offsets than were used during tracing of the old function. As such, in order for the new function to utilize the trace data, a transformation may re-map memory locations/offsets internal to a data structure.

Additionally, or alternatively, one or more transformations might adapt to changes in relative parameter position. For example, an old function might have the following function signature:
  int multiply(int number, int multiplication_factor);
A new function, on the other hand, might receive the same input data, but use a different ordering of parameters:
  int multiply(int multiplication_factor, int number);
Because the ordering of parameters have changed, the new function may expect to find the parameters at different locations than were used during tracing of the old function. This could be a different memory address, a different register, a register instead of a memory address, or a memory address instead of a register. As such, in order for the new function to use the trace data, a transformation may re-map the locations of these parameters.

Notably, in order to determine how perform any of the foregoing transformations, the transformation identification sub-component 116b may need to determine mappings between data used by an old function and data used by a new function. In embodiments, such mappings could be obtained based, at least in part, on debugging symbols. For example, if the source code from which an old function in application 112 was compiled and the source code from which a corresponding new function in application 113 was compiled use the same name for a variable, and if debugging symbols are available for those applications, then the symbols might be usable to determine where the variable is stored by each application (e.g., which memory location, register, etc.). If these storage locations are different, it is fairly straightforward for the transformation identification sub-component 116b to determine a mapping of the location of the variable as used by the old function to a new location as expected by the new function. This mapping could be, for example, a mapping between two different memory locations, a mapping between a memory location and a register, or a mapping between two different registers.

In addition (or as an alternative) to use of symbols, the transformation identification sub-component 116b might rely on user input. For example, embodiments might use symbols along with human supervision. For instance, if calling conventions are different between the source code of application 112 and application 113, the transformation identification sub-component 116b might receive user input that maps calling conventions, variable names, variable position, etc. found in the symbols of application 112 to calling conventions, variable names, variable position, etc. found in the symbols of application 113. From there, the transformation identification sub-component 116b might use the symbols to identify mappings for particular inputs and/or outputs between the old and new functions. Of course, mappings might be provided fully by user input.

Once the transformation identification sub-component 116b has identified any applicable mappings, the transformation projection sub-component 117b can "project" these mappings during emulation in a variety of manners. One projection technique moves the actual data of each input from a location used by the old function in application 112 to a location used by a new function in application 113, and then emulates the new function. For example, for each input, this projection technique might move the input's data from a first memory location used by the old function to a second memory location used by the new function, from a memory location used by the old function to a register used by the new function, from a register used by the old function to a memory location used by the new function, or from a register used by the old function to a register used by the new function, and then emulate the new function once the data of each input is in its expected place.

In embodiments, this projection technique might be utilized only for inputs that are accessed only once by the new function (e.g., at the beginning of the function), and/or that are not accessed by any alias. Since registers can generally not be aliased, this first projection technique might be particularly useful to project register-to-register mappings. After emulating the new function, this first projection technique might also do a reverse mapping on one our more outputs, by moving the data of each output from the location where it was stored by the new function in application 113 to a location where it would be expected by the old function in application 112.

Other projection techniques may be useful when an input or output is expected at a different storage location by the new function than was used by the old function, and when the input or output is accessed multiple times by the new function and/or it is accessed using one or more aliases. These situations could arise, for example, when the input or output is a global variable and it is accessed both via its global handle and via an alias. These other projection techniques use one or more transformations that ensure that the new function always sees the input or output at an expected memory location, even if it is accessed via an alias. For example, consider the following example C source code, which might be part of application 112:

```
1:     #include <stdio.h>
3:
3:     int global_array[ ] = {1, 2, 3, 4, 5};
4:
5:     void multiply( int alias_array[ ], int size, int factor){
6:         int local_array[size];
7:         for (int i = 0; i < size; i++) {
8:             local_array[i] = global_array[i];
9:         }
10:        for (int i = 0; i < size; i++){
11:            alias_array[i] = local_array[i] * factor;
12:        }
13:    }
14:
15:    int main( ) {
16:        multiply( global_array, 5, 2 );
17:        for (int i = 0; i < 5; i++ ){
18:            printf("%d ", global_array[i]);
19:        }
20:    }
```

The code initializes a global array, global_array at line 3, which includes five array elements that are initialized to 1, 2, 3, 4, and 5. Then, calling a multiply function at line 16 the code multiplies each of these array elements by a value of 2. Finally, using the for loop at lines 17-19, the code outputs each element of the array after the multiplication (i.e., the values 2, 4, 6, 8, and 10). Notably, the multiply function makes two accesses to each memory location of global_array. One of these memory accesses (i.e., line 8) uses the global_array handle to read the existing value from a memory location, and another of these memory access (i.e., line 11) uses the alias alias_array to write a multiplied value to this memory location.

FIG. 6A shows an example 600a that includes a table 601a that shows a possible memory layout during execution of the foregoing code. Table 601a shows that during execution of the code, such as during tracing or a later emulation of application 112, the global_array handle might dereference to virtual memory address 0x852c020, while the alias_array alias may dereference to virtual memory address 0xe76d4728 (which may store a pointer to virtual memory address 0x852c020).

Now, suppose that, in application 113, the multiply function has been modified in order to remove one of the internal for loops:

```
1:     #include <stdio.h>
2:
3:     int global_array[ ] = {1, 2, 3, 4, 5};
4:
5:     void multiply( int alias_array[ ], int size, int factor){
6:         for (int i = 0; i < size; i++){
7:             alias_array[i] = global_array[i] * factor;
8:         }
9:     }
10:
```

-continued

```
11:    int main( ) {
12:        multiply( global_array, 5, 2 );
13:        for (int i = 0; i < 5; i++ ){
14:            printf("%d ", global_array[i]);
15:        }
16:    }
```

Notably, while, in the example, an internal for loop was removed in the C source code for application 113, it may have alternatively been removed by a compiler optimization (i.e., the source code may have remained the same, but compiler optimization might have resulted in machine code lacking both loops). Either way, in the machine code corresponding to application 113, the multiply function now has one internal for loop, instead of two. Returning to FIG. 6A, example 600a also includes a table 602a that shows a possible memory layout that might be possible during the emulation of application 113. Table 602a shows that during emulation of the code, such as emulation of application 113, the global_array handle might now dereference to virtual memory address 0x160d020, while the alias_array alias may dereference to virtual memory address 0xe5f3728 (which may store a pointer to virtual memory address 0x160d020).

Due to the differing memory layouts expected by application 112 and application 113, there can be challenges in replaying the multiply function in application 113, based on the trace data gathered during execution of the multiply function in application 112. In embodiments, when emulating the multiply function (during emulation of application 112 and/or application 113) using this trace data, the projection sub-component 117b can transparently handle these discrepancies to ensure that the multiply function always sees the correct data when it accesses the array elements, whether they are being accessed via the global_array handle or the alias_array alias during emulation of application 112 and/or application 113.

One way for the projection sub-component 117b to transparently handle these discrepancies is for it to cause the emulation component 110 to use virtual addressing (or similar) techniques to map multiple memory addresses as expected by applications 112 and 113 to the same backing memory used by the emulation component 110. This could include, for instance, mapping multiple virtual memory addresses to the same backing memory address. In embodiments this mapping by the emulation component 110 is similar how hardware might typically map two virtual addresses to the same physical address—i.e., code can access both virtual addresses by their independent address, but the code is actually accessing the same underlying memory location. As such, the two virtual addresses are always in sync. For example, FIG. 6B illustrates an example 600b that includes tables 601b and 602b. These tables 601b/602b correspond generally to the tables 601a/602a of FIG. 6A, but include an additional columns showing possible physical address mappings. As shown, the projection sub-component 117b might cause the emulation component 110 to map both of virtual memory addresses 0x852c020 and 0x160d020 to the physical memory address 0xff020 (i.e., array element 1), to map both of virtual memory addresses 0x852c024 and 0x160d024 to physical memory address 0xff024 (i.e., array element 2), etc. Then, physical memory address 0xff020 (i.e., array element 1) can be accessed both using virtual memory address 0x852c020 (i.e., application 112's pointer) or virtual memory addresses 0x160d020 (i.e., application 113's pointer), physical memory address 0xff024 (i.e., array element 2) can be accessed both using virtual memory address 0x852c024 (i.e., application 112's pointer) or virtual memory addresses 0x160d024 (i.e., application 113's pointer), and so on. As such, application 113 can execute using the virtual memory addresses that is expects, while accessing the same data traced during execution of application 112 Further, even if application 113 were to get a pointer/alias that still uses application 112's address, it can still access the appropriate memory location.

Another way to synchronize old and new memory locations is through use of breakpoints. For example, the projection sub-component 117b can set breakpoints on memory addresses that needs to be mapped. Then, during the breakpoint, the projection sub-component 117b can ensure that the "old" memory location used by application 112 is in sync with the "new" memory location expected by application 113, and resume code execution. For example, FIG. 6C illustrates an example 600c that includes tables 601c and 602c. These tables 601c, 602c correspond generally to the tables 601b,602b of FIG. 6B, but show that the array elements are now mapped physical addresses for applications 112 and 113. FIG. 6C also shows that values from physical memory addresses used by application 113 have been copied to corresponding physical memory addresses used by application 112. In particular, FIG. 6C represents memory state after the second iteration of the for loop in application 113. During the first iteration of the loop during emulation of application 113, the projection sub-component 117b caused a break on virtual address 0x160d020. During that break, the projection sub-component 117b copied the value written (i.e., 2) to the corresponding virtual address (i.e., 0x852c020) used by application 112. Similarly, during the second iteration of the loop during execution of application 113, the projection sub-component 117b caused a break on virtual address 0x160d024. During that break, the projection sub-component 117b copied the value written (i.e., 4) to the corresponding virtual address (i.e., 0x852c024) used by application 112.

Notably, the projection sub-component 117b might cause breakpoints on both ends of a mapping (i.e., the address used by application 112 as well as the address used by application 113), or might cause breakpoints on a single end of the mapping only (e.g., only the address used by application 113, or only the address used by application 112). If there are breakpoints on both ends, the projection sub-component 117b may only need to break on writes. Thus, for example, if application 113 performs a write to a mapped address during its emulation, the projection sub-component 117b may break and then copy the value to application 112's address; conversely, if application 112 performs a write to a mapped address during its emulation, the projection sub-component 117b may break and then copy the value to application 113's address. If there are only breakpoints on a single end, on the other hand, the projection sub-component 117b may break on both reads and writes. In this case, when the projection sub-component 117b breaks on a write by the monitored application, it can copy the new value to the other application's address. Alternatively, when the projection sub-component 117b breaks on a read by the monitored application, it check the other application's memory address and copy an updated value to the monitored application's memory address, if needed.

Whether using virtual memory addressing or breakpoints, these techniques both essentially keep a memory location used by application 112 in sync with a corresponding memory location used by application 113. However, challenges can arise if there is a memory address conflict arising from internal changes in a data structure. For example, consider the following example C source code, which might be part of application 112:

```
1:    #include <stdio.h>
2:
3:    struct Foo {
4:        int Integer;
5:        char Character;
6:    };
7:
8:    void print( struct Foo* bar) {
9:        printf( "Integer: %d\n", bar->Integer );
10:       printf( "Character: %c\n", bar->Character );
11:   }
12:
13:   int main( ) {
14:       struct Foo foo;
15:
16:       foo.Integer = 1;
17:       foo.Character = 'A';
18:
19:       print( &foo);
20:   }
```

The code declares a struct of type Foo at line 14 (i.e., foo), which includes two members: an int named Integer and a char named Character. At lines 16 and 17, these fields are initialized to the number 2 and the character A, respectively. Then, after passing a reference to the foo structure to a print function at line 19, the print function uses an alias, bar, to output the members of the struct.

FIG. 7 shows an example 700 that includes a table 701 that shows a possible memory layout during execution of the foregoing code. Table 701 shows that during execution of the code, such as during tracing or a later emulation of application 112, the foo.Integer member might dereference to virtual memory address 0x852c018, the foo.Character member might dereference to virtual memory address 0x852c01c, and the bar alias might dereference to virtual memory address 0xe76d4728 (and store a pointer to virtual memory address 0x852c018).

Now, suppose that in application 113 the Foo struct is modified, swapping its members:

```
1:    #include <stdio.h>
2:
3:    struct Foo {
4:        int Character;
5:        char Integer;
6:    };
7:
8:    void print( struct Foo* bar) {
9:        printf( "Integer: %d\n", bar->Integer);
10:       printf( "Character: %c\n", bar->Character);
11:   }
12:
13:   int main( ) {
14:       struct Foo foo;
15:
16:       foo.Integer = 1;
17:       foo.Character = 'A';
18:
19:       print( &foo );
20:   }
```

FIG. 7 also includes a table 702 that shows a possible memory layout that might be expected during the emulation of application 113. Table 702 shows that during execution of the code, such as during emulation of application 113, the foo.Integer member might now dereference to virtual memory address 0x852c01c, while the foo.Character member might now dereference to virtual memory address 0x852c018.

Now, simply keeping "old" and "new" memory addresses in sync (e.g., using virtual addressing or breakpoints) does not work. For example, suppose that that the projection sub-component 117b were to map both of virtual addresses 0x852c018 and 0x852c01c to physical address 0xff020 (i.e., 0x852c018 as corresponding to foo.Integer in application 112, and 0x852c01c as corresponding to foo.Integer in application 113). In this situation, application 112 would access the proper memory location (i.e., physical address 0xff020) when accessing the Integer member (either via the foo handle or the bar alias). This is because the Integer member corresponds to virtual address 0x852c018, which in this example is being mapped to physical address 0xff020. However, application 113 would access an improper memory location (i.e., physical address 0xff020 again) when accessing the Character member. This is because the Character member corresponds to virtual address 0x852c01c in application 113, which in this example is also being mapped to physical address 0xff020. Similar conflicts would arise if using breakpoints to synchronize memory locations.

The projection sub-component 117b can handle these types of conflicts in several ways. One way is for the projection sub-component 117b to handle these conflicts is for it to keep bookkeeping information about addresses used/expected by each application, and dynamically translate/substitute appropriate memory addresses when dereferencing them during emulation. For example, when application 113 dereferences the address 0x852c01c for foo.Integer, the projection sub-component 117b might dynamically substitute application 112's virtual memory address (i.e., 0x852c018), such that application 113 actually uses application 112's virtual memory address (i.e., 0x852c018) to access the Integer member. Similarly, when application 113 dereferences the address 0x852c018 for foo.Character, the projection sub-component 117b might dynamically substitute application 112's virtual memory address (i.e., 0x852c01c), such that application 113 actually uses application 112's virtual memory address (i.e., 0x852c01c) to access the Character member. The projection sub-component 117b might permit application 112 to use its expected virtual memory address.

Notably, these bookkeeping/substitution techniques also work for the array examples above. For example, when application 113 dereferences global_array, the projection sub-component 117b might substitute application 112's virtual memory address (e.g., 0x160d020) for applications 113's virtual memory address (i.e., 0x852c020), such that application 113 actually uses application 112's virtual memory address (e.g., 0x160d020). Similarly, when application 113 dereferences alias_array, the projection sub-component 117b might substitute application 112's pointer (e.g., 0x160d020) for applications 113's pointer (i.e., 0x160d020), such that application 113 actually uses application 112's pointer (e.g., 0x160d020).

While the foregoing examples are fairly straightforward, it will be appreciated by one of skill in the art that the bookkeeping information needed to properly emulate some programs might get fairly complicated, particularly if there are many memory locations to track, and/or if there are multiple levels of aliasing/indirection. Bookkeeping information could be developed based on a static analysis (i.e., of the code of application 112 and of application 113), and/or using a runtime analysis (i.e., of emulation of application 112 and of application 113).

As an alternative (or as a supplement) to keeping detailed bookkeeping information, the projection sub-component 117b might use symbols (if available) to track the appropriate mappings. Notably, if symbols are available, every memory access can be tracked to a set of symbols for an accessed data structure. Thus, based on symbols, a dereferenced memory address can be associated with data structure-specific information. For example, an access by application 113 to address 0x852c01c can be associated, via symbols, with the struct foo of type Foo, and the member foo.Integer of type int. This symbolic information can then be used to find the corresponding member, foo.Integer, in application 112 and the appropriate memory address (i.e., 0x852c018) in the trace data. Thus, the projection sub-component 117b might break on every memory access during emulation of application 113 and validate that access against symbols to obtain the appropriate address mappings to application 112, and project an address transformation as necessary. Alternatively, the projection sub-component 117b might break only on memory accesses to a data structure type (e.g., Foo) that is known to need a transformation.

In order to help track memory transformation, the projection sub-component 117b might tag memory locations and/or pointers as being transformed. For simplicity, colors are used herein for tags, and a tagged entity is referred to as being "colored," but it will be appreciated that any type of tag could be used (e.g., integer or hexadecimal values, etc.). For example, when the multiply function in application 113 accesses bar->Integer, the projection sub-component 117b might observe that pointer being used in not colored and that the memory location being accessed is not colored. After transforming the dereferenced address (i.e., 0x852c018) to the proper address used by application 112 (i.e., 0x852c018), the projection sub-component 117b might color the memory location storing foo.Integer (e.g., c0xff020) (e.g., with a 'red' tag), and also color the transformed pointer with the same identifier (e.g., red). If that colored memory location were to ever be accessed later using with a pointer having a matching color, then the projection sub-component 117b would not need to apply any transformation. However, if that colored memory location were to be accessed later using with a pointer having no color, then the projection sub-component 117b would need to apply the transformation and also color that pointer with the memory location's color. Notably, if a colored memory location is accessed by a colored pointer that does not match the memory location's color, that means a bug likely occurred (either in one or more of application 112/113, or in the projection sub-component 117b).

Figure 8:
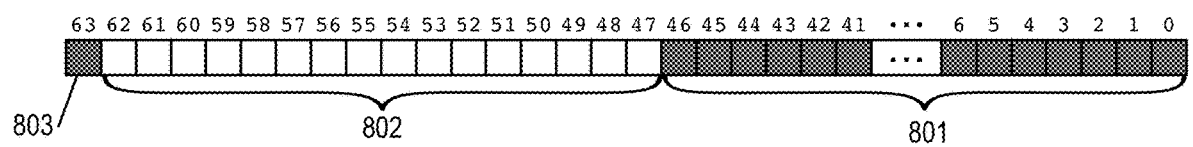
FIG. 8 illustrates an example of a 64-bit pointer, including possible reserved bits that can be used for tagging.

In embodiments, a tag is stored in "reserved" bits of a memory address (e.g., for both a pointer and a memory location). For example, FIG. 8 illustrates and example 800 of a 64-bit pointer. As will be appreciated, even though there may be 64-bits allocated for storing memory addresses, contemporary processors may not actually utilize all of those bits for addressing. As shown, for example, a processor may use a group 801 of the lower bits (e.g., bits 0 to 46) for an actual memory address, and use the highest bit 803 (e.g., bit 63) to signal whether the address applies to user mode or kernel mode. That leaves a group 802 of "reserved" bits toward the top of the address that might be usable to store tag information. In embodiments, these reserved bits could store a value (e.g., a numeric or hexadecimal identifier) for the tag that applies to that address.

Notably, using tagging/coloring, the projection sub-component 117b could keep track of multiple values for a given address. Thus, a memory location might have a different value in different colors. For example, one physical memory location could be virtually addressed using a particular address that is colored (e.g., using reserved bits) red and that stores the value A, while another physical memory location could be virtually addressed using the same particular address that is colored (e.g., using reserved bits) blue and that stores the value B. Thus, this address would store the value A in the red color, and store the value B in the blue color. These techniques could be useful, for example, when keeping two memory locations in sync using breakpoints, particularly when symbols are not available.

While the foregoing transformations have primarily focused on adapting to changes in data location, other transformations might transform an input or output's data size and/or format. That is, a function in application 112 might have taken an input or produce an output having one data size and/or format during tracing, while a corresponding function in application 113 might take a corresponding input or produce a corresponding output having another data size and/or format.

Figure 9A:
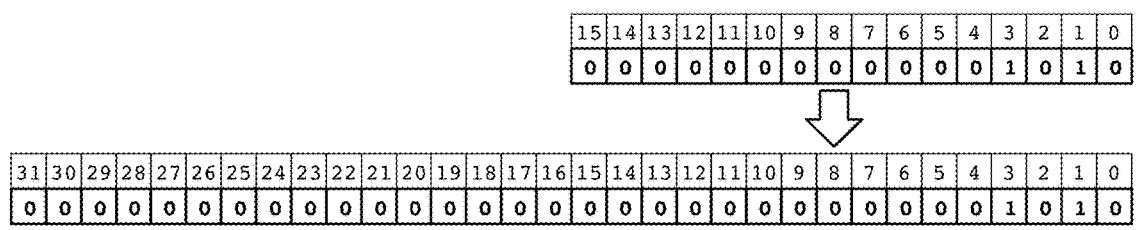
FIG. 9A illustrates an example in which a 16-bit representation of the number 10 is projected into a 32-bit representation, and in which the projection 0-extends the 16-bit value to fill 32 bits.
Figure 9B:
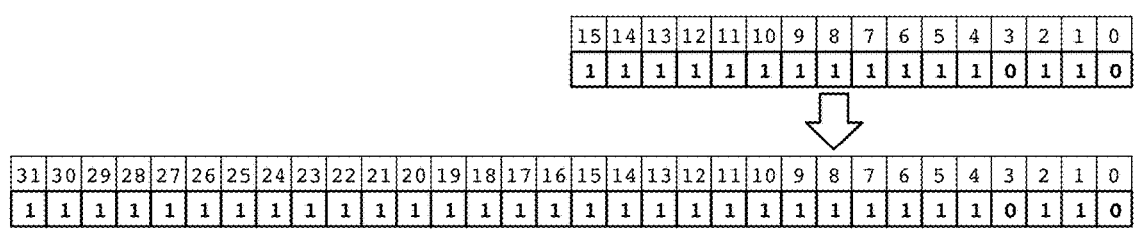
FIG. 9B illustrates an example in which a 16-bit representation of the number −10 is projected into a 32-bit representation, and in which the projection 1-extends the 16-bit value to fill 32 bits.

As an example of a transformation of data size, the function in application 112 might take an input having one data size (e.g., 32-bits), while the corresponding function in application 113 might take an input having a larger data size (e.g., 64-bits). In this situation, the data size expected by application 113 is larger than the data size used by application, and it can therefore store a superset of the data used by application 112. As such, during emulation of the function of application 113, the projection sub-component 117b can project the value of the input that was traced during execution of application 112 into the new data size. Depending on the data type of the input, the projection sub-component 117b might need to sign-extend the value during the projection. For example, FIG. 9A shows an example 900a in which a 16-bit representation of the number 10 is projected into a 32-bit representation, and in which the projection 0-extends the 16-bit value to fill 32 bits. FIG. 9B, on the other hand, shows an example 900b in which a 16-bit representation of the number −10 is projected into a 32-bit representation, and in which the projection 1-extends the 16-bit value to fill 32 bits. In embodiments, the projection sub-component 117b might use symbols to determine the input's data type, and thus what type of extension (i.e., signed or unsigned) to perform.

There are other potential extension cases—for example, when extending an XMM register (part of the Streaming SIMD Extensions) into an x86 Advanced Vector eXtensions (AVX) register. For instance, an XMM register might contain four 32-bit integers or two 64-bit integers, while an AVX might contain eight 32-bit integers or eight 64-bit integers. Thus, an extension might involve extending four 32-bit integers into eight 32-bit integers, or extending two 64-bit integers into eight 64-bit integers.

Notably, if the superset data transformation is from a register to a register, or from a memory location to a register, the projection sub-component 117b might be able to simply perform the projection into the new register. However, if the superset data transformation is from a memory location to a memory location, or from a register to a memory location, the projection sub-component 117b might needed to perform additional memory mappings to ensure that the new (larger) storage location in memory would not overlap with other data stored in memory. These mappings could, for example, project the new, larger, data value into a different region of memory and transform pointers used by application 113 accordingly to point to that new memory region.

Transformation of data format might alternatively include performing a subset conversion—where the data size used by application 113 is smaller than the data size used by application 112. For example, the function in application 112 might take an input having one data size (e.g., 64-bits), while the corresponding function in application 113 might take an input having a smaller data size (e.g., 32-bits). Here, the projection sub-component 117b might verify that the value of the input that was actually traced into the recorded execution(s) 114 would fit in the smaller data size and, if so, project the value into the smaller data size. For example, FIG. 10A shows an example 1000a in which a 32-bit representation of the number 10 is projected into a 16-bit representation. FIG. 10B, on the other hand, shows an example 1000b in which a 32-bit representation of the number −10 is projected into a 16-bit representation. In embodiments, the projection sub-component 117b might use symbols to determine the input's data type, in order to determine whether an input's value will fit. For instance, in example 1000b, symbols might be used to determine that the value is a signed integer, and that the 1's in the high 16 bits can therefore be truncated. In embodiments, the projection sub-component 117b might track any operations acting on the projected input data to determine if execution of the code of application 113 causes the new smaller data size to overflow (e.g., as an intermediary value). If so, the output component 119 might raise an alert.

Transformation of data size and/or format might additionally, or alternatively, include performing conversions of data types. For example, the projection sub-component 117b might perform conversions between character and integer data types, conversions between integer data types and floating point data types, conversions between different floating point data types, etc. As will be appreciated, doing some of these conversions could lose precision—for example, when converting from a float or double to an int, or when converting from a double to a float. In these situations, the projection sub-component 117b might perform rounding, use the output component 119 might to raise an alert and/or obtain user input, etc.

Figure 11A:
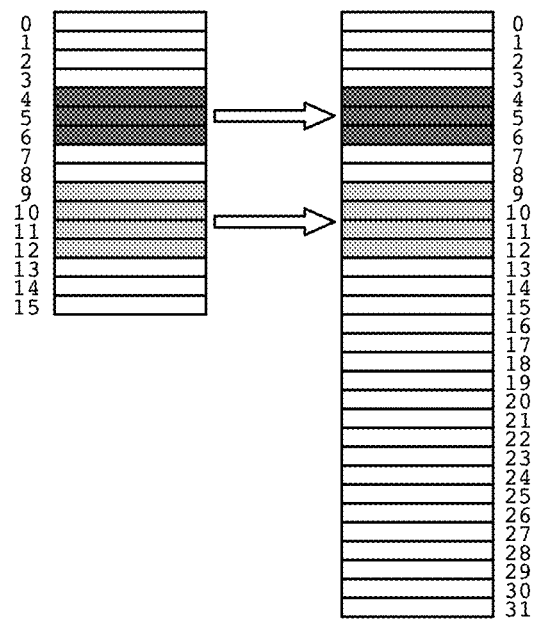
FIG. 11A illustrates and example of mapping pointers in a 16-location memory space to pointers in a 32-location memory space.

Transformation of data size and/or format might additionally, or alternatively, include performing conversions between pointer sizes (e.g., 32-bit pointers to 64-bit pointers). A challenge that arises when converting pointer sizes is that address space size changes as well. For example, 32-bit pointers can address up to 4 GiB of memory (i.e. 2^32 bytes), while 64-bit pointers can address up to 16 EiB of memory (i.e., 2^64 bytes). If converting a pointer from a smaller pointer size to a larger pointer size, it may be straightforward to re-map the pointers, since the larger memory space can contain the entire smaller memory space. For example, FIG. 11A illustrates a simple conceptual example 1100a of mapping pointers in a 16-location memory space (e.g., used by application 112) to pointers in a 32-location memory space (e.g., used by application 112). Here, a pointer transformation might be as simple as mapping memory addresses in the 16-location memory space to corresponding memory addresses in the 32-location memory space. For example, the addresses for memory locations 4-6 in the 16-location memory space might be associated with one input and be mapped to the addresses for memory locations 4-6 in the 32-location memory space, the addresses for memory locations 9-12 in the 16-location memory space might be associated with another input and be mapped to the addresses for memory locations 9-12 in the 32-location memory space, and so on.

Figure 11B:
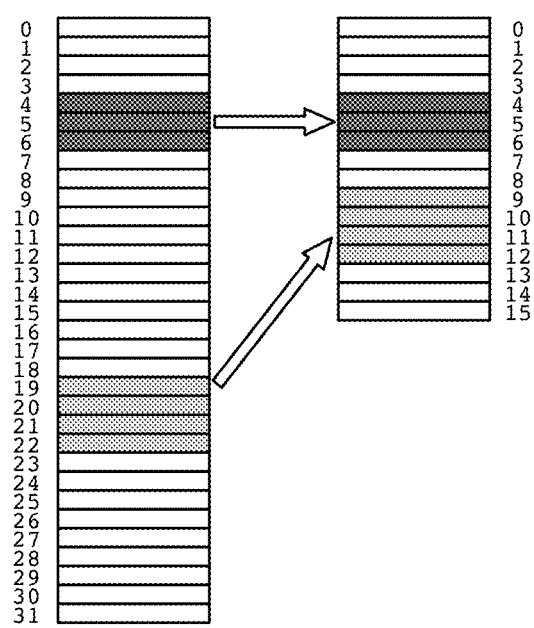
FIG. 11B illustrates an example of mapping pointers in a 32-location memory space to pointers in a 16-location memory space.

If converting a pointer from a larger pointer size to a smaller pointer size, the projection sub-component 117*b* might re-map pointers that would be beyond the smaller memory space to a location that is within the smaller memory space. For example, FIG. 11B illustrates a simple conceptual example 1100*b* of mapping pointers in a 32-location memory space (e.g., used by application 112) to pointers in a 16-location memory space (e.g., used by application 113). Here, a pointer transformation might also be a simple mapping between memory addresses in the 32-location memory space to corresponding memory addresses in the 16-location memory space. For example, the addresses for memory locations 4-6 in the 32-location memory space might be mapped to the addresses for memory locations 4-6 in the 16-location memory space, similar to example 1100*a*. However, the 32-location memory space also includes an input that is located at memory locations 19-22, which would be beyond the 16-location memory space. Accordingly, as shown, the projection sub-component 117*b* might map memory locations 19-22 in the 16-location memory space to locations that are within the 16-location memory space, such as locations 9-12. As such, the projection sub-component 117*b* may be able to enable emulation of application 113 using a smaller memory space, based on application 112's trace data gathered using a larger memory space, so long as application 112 did not actually use more memory during its tracing than would actually be able to fit within the smaller memory space, and so long as application 113 does not exceed that smaller memory space during its emulation.

Using one or more of the foregoing techniques discussed above, the projection sub-component 117*b* can even adapt for changes in the overall size of a data structure. For example, suppose that application 112 used a struct having the following definition:

```
struct Foo {
    int field1;
    char field2;
};
``` while application 113 uses a struct having the following definition:

```
struct Foo {
    char field2;
    long field1;
};
```

Here, not only have the fields been swapped, but the integer has been converted to a long. As such, the overall sized of the struct has changed. The projection sub-component 117*b* can adapt to these changes by utilizing a plurality of the foregoing transformations, such as using one first transformations to project the int into a long (i.e., changing both data size and data format), and using one or more other transformation to re-map the relative addresses of the individual structure members.

In embodiments, when emulating the executable instructions of a "new" function (e.g., function 402-*b*1) from application 113, with the traced data inputs used by an "old" function (e.g., function 402-*a*1) from application 112, those executable instructions need not be of the same ISA. Thus, for example, application 112 might be compiled against the x86_64 ISA, while application 113 might be complied against the ARM ISA. In this example, long as the inputs used by an old function in the x86_64 ISA are provided to the new function in the ARM ISA as they would be expected by the ARM ISA (e.g., applying zero or more of the foregoing transformations, as needed), the emulation component 110 might emulate ARM instructions to execute the new function in application, even though the trace data being utilized by those ARM instructions was gathered against x86_64 instructions. During ISA transformations, the projection sub-component 117*b* might apply and additional "endianness" transformation, as needed. For example, some processor ISA's are big-endian (i.e., the most significant bit is stored at the lowest address), while other processor ISA's are little-endian (i.e., the least significant bit is stored at the lowest address). As examples, the x86 family of processors are generally little-endian, the ARM family of processors come in both big-endian and little-endian variants, and the PowerPC family of processors are generally big-endian. When translating endianness, the projection sub-component 117*b* might leave data stored in memory using the endianness used by application 112 and translate them during runtime of a function of application 113 as data values are read and written, or might transform the data in memory prior to emulating the function of application 113.

As noted, if the executable instructions of function 402-*b*1 are functionally equivalent to the executable instructions of function 402-*a*1, then emulation of the executable instructions of function 402-*b*1 using these recorded data inputs should produce the same data values in outputs 404-1 that were generated by function 402-*a*1. The inputs/outputs comparison component 118 can compare the outputs generated when emulating function 402-*b*1 to the outputs that were generated by function 402-*a*1 to determine whether or not this is the case. If the inputs/outputs comparison component 118 determines that the outputs are the same when receiving the same inputs, then the executable instructions of function 402-*a*2 do appear to be equivalent to the executable instructions of function 402-*a*1 (at least for these inputs). If the outputs are not the same when receiving the same inputs, then the executable instructions of function 402-*a*2 may definitely be determined to not be equivalent to the executable instructions of function 402-*a*1. In embodiments, the outputs function 402-*a*1 might be obtained from recorded execution 114, or might be obtained by also emulating the executable instructions of function 402-*a*1.

As was mentioned, a function might include gaps, such as a gap caused by call to a non-traced kernel call. In embodiments, the emulation component 110 can use one or more techniques to gracefully deal with these gaps. As a first example, the emulation component 110 might determine from an accessed recorded execution 113 what inputs were supplied to the kernel call, and then emulate the kernel call by the emulation component 110 based on those inputs. As a second example, the emulation component 110 might treat the kernel call as an event that can be ordered among other events in an accessed recorded execution 113, and rather than emulating the kernel call, the emulation component 110 can ensure that any visible changes made by the kernel call (e.g., changed memory values, changed register values, etc.) are exposed as inputs to code that executes after the kernel call. As a third example, the emulation component 110 might set up appropriate environmental context, and then make an actual call to a running kernel using these inputs. As a fourth example, emulation component might simply prompt a user for the results of a kernel call.

The output component 119 can output the results of having emulated the code of application 113 using input data values obtained from recorded execution 114 of execution of application 112. For example, the output component 119 might provide any results generated by the inputs/outputs comparison component 118, and/or might provide the results of emulation of the code of application 113 to a time-travel debugging component or user interface, enabling, for example, forward and reverse breakpoints on the code of application 113, rather than the code of application 112. If the output component 119 provides results generated by the inputs/outputs comparison component 118 it might report any differences between the outputs generated during emulation of application 113 and the outputs generated by application 112 during it recorded execution, or it might report that these outputs were identical.

In embodiments, the debugger 109 might be configured to validate, from the recorded execution(s) 114, whether application code (e.g., applications 112/113) actually followed one or more parameter annotations and/or contracts when it was executed and/or emulated. As used herein, the terms "parameter annotations" and "contracts" refer to specific code annotations that define how a code element or section should behave. For instance, code annotations could specify preconditions (e.g., requirements that must be met when entering a method or property), postconditions (e.g., expectations at the time a method or property code exits), object invariants (e.g., expected state for a class that is in a good state), and the like. An example parameter annotations technology is SAL Annotations in C/C++, and an example of contracts is Code Contracts in .NET/C#. For example, based on emulation of code from application 113 based on a recorded execution 114, the debugger 109 might be able to identify specific instructions in the code of application 113 that did not enforce a contract or violated a contract specified in that code. Similarly, based on the outputs of execution of application 112 (e.g., as recorded in a recorded execution 114, or as generated by a later emulation of that code based on a recorded execution 114), the debugger 109 might be able to identify specific instructions in the code of application 112 that did not enforce a contract or violated a contract specified in that code. As such, the debugger 109 can leverage parameter annotations and/or code contracts to expose potentially costly and/or hard to find bugs.

Figure 5:
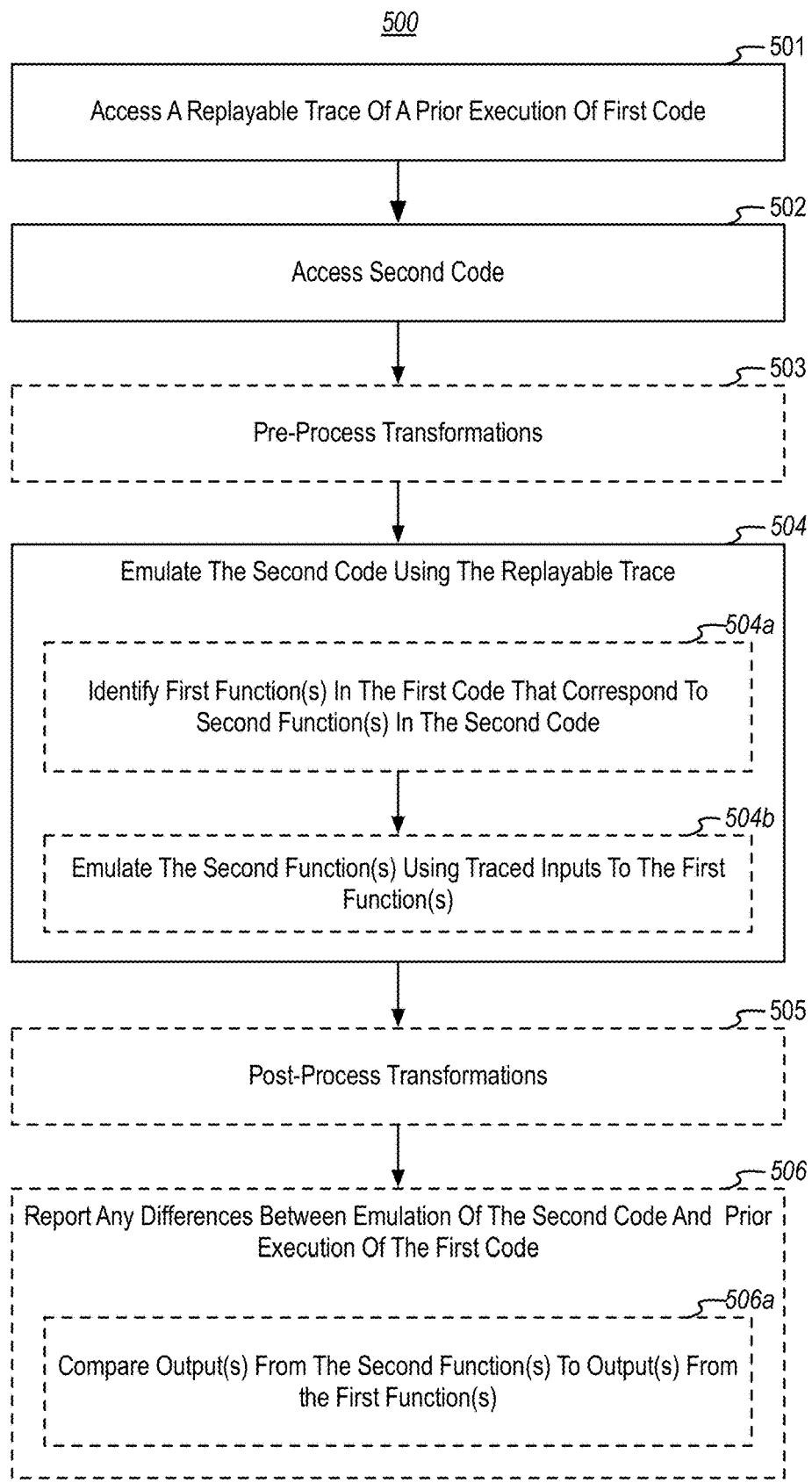
FIG. 5 illustrates a flowchart of an example method for emulating execution of second executable code using trace data gathered during execution of first executable code.

FIG. 5 illustrates a flowchart of an example method 500 for emulating execution of second executable code using trace data gathered during execution of first executable code. Method 500 is now described in connection with FIGS. 1-4.

As shown in FIG. 5, method 500 includes an act 501 of accessing a replayable trace of a prior execution of first code. In some embodiments, act 501 comprises accessing a replayable recorded execution of a prior execution of first executable code, the replayable recorded execution including one or more inputs that were consumed by one or more first executable instructions during the prior execution of the first executable code. For example, the data access component 115 can access a recorded execution 114 of a prior execution of application 112 (e.g., using the trace access sub-component 115a). As shown in FIG. 3, this recorded execution 114 might include at least one data stream 301a that includes a plurality of data packets 302, each of which can include a data inputs portion 304 that records inputs to executable instructions that executed as part of the prior execution of application 112.

Method 500 also includes an act 502 of accessing second code. In some embodiments, act 502 comprises accessing second executable code that is different from the first executable code, execution of second executable code not being recorded in the replayable recorded execution. For example, the data access component 115 can access application 113 (e.g., using the code access sub-component 115b), a prior execution of which is not recorded in the accessed recorded execution 114.

As discussed, application 113 (i.e., the second code) can be functionally related to application 112 (i.e., the first code), such as being compiled from the same source code as application 112, but with different compiler flags, compiler version, or compiler type; and/or being compiled from a modified version of application 112's source code. Thus, in act 502, the first executable code and the second executable code may be compiled from identical source code, but with one or more of (i) different compiler settings or (ii) different compilers. If compiled with different compilers, the different compilers could differ based on least one of (i) compiler version or (ii) compiler type. Additionally, or alternatively, in act 502 the first executable code may be compiled from a first version of source code, while the second executable code is compiled from a second version of the source code that differs from the first version of the source code.

Method 500 may also include an act 503 of pre-processing transformations. For example, the transformation identification sub-component 116b can identify any transformations on inputs needed to enable emulation of function 402-b1 in application 113 using the inputs traced during execution of function 402-a1 in application 112. Additionally, the transformation projection sub-component 117b can perform any projections of these transformations that are needed prior to emulation of 402-b1. Methods focused on applying transformations will be discussed later in connection with FIGS. 12-14.

Method 500 also includes an act 504 of emulating the second code using the replayable trace. In some embodiments, act 504 comprises emulating execution of the second executable code using the one or more inputs from the replayable recorded execution. For example, the code substitution component 117a can use the emulation component 110 to emulate execution of application 113's code, while using execution state data from recorded execution 114 (i.e., that was obtained during execution of application 112). This emulation may include using the one or more inputs that were consumed by one or more first executable instructions during the prior execution of the first executable code as inputs to one or more second executable instructions of the second executable code during emulation of execution of the one or more second executable instructions.

As discussed, this substitution can be accomplished by the analysis component identifying "functions" in applications 112 and 113 that correspond to each other, based on these functions having the same inputs and outputs. Thus, as shown in FIG. 5, act 504 might include an act 504a of identifying first function(s) in the first code that correspond to second function(s) in the second code, and an act 504b of emulating the second function(s) using traced inputs to the first function(s). In some embodiments, act 504a might comprise identifying a first chunk of first executable instructions in the first executable code (e.g., function 402-a1) that have a same set of inputs (e.g., inputs 403-a) and a same set of outputs (e.g., outputs 404-a) as a second chunk of second executable instructions in the second executable code (e.g., function 402-b1), and act 504b might comprise emulating execution of the second chunk of executable instructions (e.g., function 402-b1) using a particular input (e.g., obtained from recorded execution 114) that was supplied to the first chunk of first executable instructions (e.g., function 402-a1) during the prior execution of the first executable code.

Method 500 may also include an act 505 of post-processing transformations. For example, the transformation identification sub-component 116b can identify any transformations needed to enable outputs of function 402-b1 in application 113 to by consumed by functions in application 112. Additionally, the transformation projection sub-component 117b can perform any projections of these transformations, or take any steps needed to undo/synchronize any transformations on inputs that were performed as part of act 503. Again, methods focused on applying transformations will be discussed later in connection with FIGS. 12-14.

Method 500 might also include an act 506 of reporting any differences between outputs of the second code and outputs of the first code. In some embodiments, act 506 comprises, reporting one or more differences between the emulated execution of the second executable code and the prior execution of the first executable code, or reporting equivalency between the emulated execution of the second executable code and the prior execution of the first executable code. As shown, act 506 might include an act 506a of comparing output(s) from the second function(s) to output(s) from the first function(s). In some embodiments, act 506a comprises comparing a first output produced by the first chunk of executable instructions when using the particular input and a second output produced by the emulated execution of the second chunk of executable instructions when using the particular input to identify one of (i) one or more differences between the emulated execution of the second chunk of executable instructions and a prior execution of the first chunk of executable instructions, or (ii) an equivalency between the emulated execution of the second chunk of executable instructions and the prior execution of the first chunk of executable instructions. For example, the inputs/outputs comparison component 118 might compare the outputs 404-1 of emulation of function 402-b1 when using traced inputs 403-1 with the outputs 404-1 that function 402-a1 produced during its prior execution when using the same inputs 403-1 and the same values for those inputs. The output component 119 can then present any differences between these outputs, or, if there are no differences, indicate that functions 402-a1 and 402-b1 execute equivalently when given identical inputs. As discussed, the outputs 404-1 of function 402-a1 might be obtained from the recorded execution 114, or from an emulation of function 402-a1 by the emulation component 110. Thus, act 506 might include obtaining the first output based on emulating execution of the first chunk of executable instructions using the particular input.

During execution of the code of application 113, the code substitution component 117a may need to account for a few different scenarios that arise from transformation of the code in application 113 as compared to the code in application 112. In one example scenario, if application 113 is non-optimized code (while application 112 is optimized), then execution of the code of application 113 may consume more stack space. Because stack pointers are relative, the code substitution component 117a may need to account for differences in the base address for the stack pointer. In another example scenario, the code in applications 112 and 113 might access data (e.g., global variables and/or class members) by relative address (e.g., as an offset from a program counter). Since the recorded execution 114 stores this data based on the addresses used by application 112, the code of application 113 might have the wrong offsets for this data. For example, suppose that application 112 accessed particular data based on an offset of 47 bytes from the program counter, while application 113 accesses this same data based on an offset of 148 bytes from the program counter. For correct emulation of application 113, the code substitution component 117a needs to account for the differences in this relative access. In some embodiments, the code substitution component 117a might perform a static analysis of the code of applications 112 and 113, and translate the offset (as appropriate) in the applications 113's code. In other embodiments, the code substitution component 117a might map the code of application 113 into some other memory location (that would normally be inaccessible) in a manner that aligns with the data of application 112. Then, when application 113 makes a relative data access, this mapped code is executed to perform the access, with the relative address being correctly aligned. This could be accomplished for example, by using a memory range breakpoint in application 113's data section, which redirects to the mapped code when triggered. Thus, in method 500, emulating execution of the second chunk of executable instructions might include at least one of translating a pointer offset in the second executable code to align with a pointer offset used by the first executable code, or mapping the second executable code to align with memory offsets used by the first executable code. Other example scenarios include dealing with differences in aliasing behaviors between different compilers, dealing with the order in which different compilers place data in memory, dealing with differences how different compilers lay out classes, etc. In any of these scenarios, symbols can be useful to identify and account for the differences between application 112 and application 113. In embodiments, these differences might also be expressly identified by a compiler.

As an example of using symbols to identify/account for differences between applications 112 and 112, suppose that application 113 includes new code that accesses a global variable. That access will be to a known range of memory addresses, such as the data section of a library. In this case, the emulation component 110 might trap any accesses to this range of memory addresses. The code substitution component 117a could use application 113's symbols to determine the particular memory address of the global variable being accessed. The code substitution component 117a could also use application 112's symbols to determine the previous memory address for that same global variable in the old code. The code substitution component 117a can then cause the emulation component 110 to serve that memory access (read/write) using the old memory address instead of the new one. Thus, symbols have been used to translate the memory layout of globals across two versions of a library. In embodiments, all accesses may need to go through the mapping, because it is possible that between two accesses to the "new" address there is an access to the "old" address (e.g. via a pointer). Notably, this approach can work in either direction—i.e., using the old addresses and mapping accesses to the new address to the old ones via symbols, or using the new address and mapping the accesses to the old address to the new ones via symbols.

In embodiments, the debugging component 109 might include one or more query functions (not shown) that are able to perform queries over recorded execution 114. For example, these query functions might identify memory allocations and deallocations, and determine if there are any allocations that do not have a corresponding deallocation (i.e., a memory leak). In embodiments, these query functions could be extended to perform such queries over the emulated execution of application 113. As such, these query functions could operate as "checkers" to verify whether application 113 has fixed and/or introduced issues, such as memory leaks.

Accordingly, the embodiments described herein leverage historic debugging technologies to emulate execution of non-traced code based on trace data from a recorded execution of related traced code. Thus, the embodiments described herein use a recorded execution of first code to guide emulation of second code that was not traced into this recorded execution. Since the first and second code may have differences, but may be functionally related, emulating non-traced code with a recorded execution of related traced code can be useful to identify compiler bugs (e.g., when different compiler flags, compiler versions, or compiler products result in the production of functionally distinct binaries from the same source code), to determine if source code changes address undesired software behaviors and/or introduce new undesired software behaviors, to enable debugging of non-optimized code based on a trace of optimized code, etc.

Figure 12:
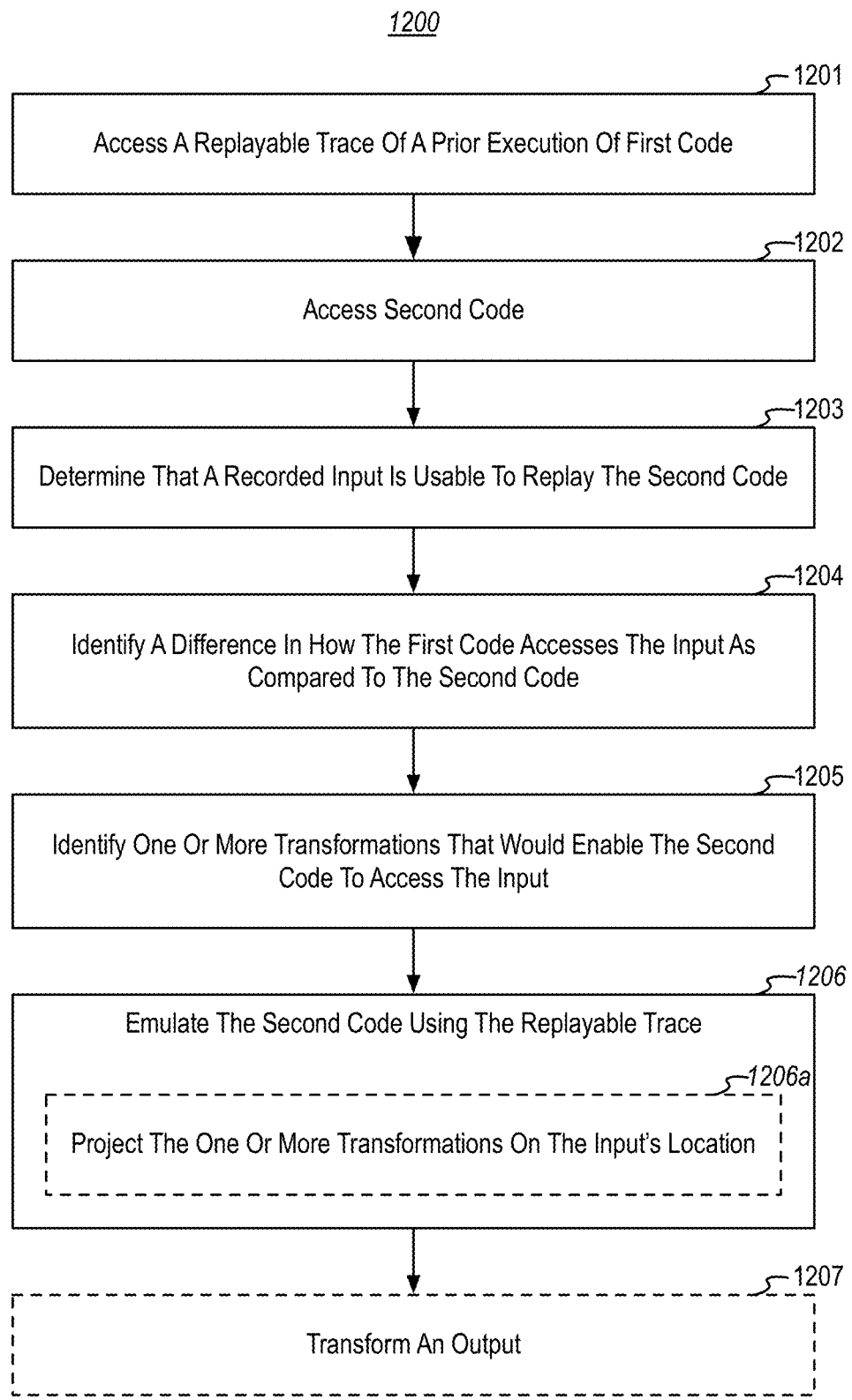
FIG. 12 illustrates a flowchart of an example method for mapping input locations to enable execution of second executable code using trace data gathered during execution of first executable code.

FIG. 12 illustrates a flowchart of an example method 1200 for mapping input locations to enable execution of second executable code using trace data gathered during execution of first executable code. In embodiments, method 1200 focuses primarily on transformations that allow for changes in a function's ABI and other re-mappings between memory locations, between register locations, or between memory locations and register locations. In embodiments, these transformations can also allow—among other things—for changes in a data structure's internal layout, but where the overall size of the data structure stays the same. As will be appreciated, method 1200 might be embodied within a computer system and/or a computer program product.

As shown in FIG. 12, method 1200 includes an act 1201 of accessing a repayable trace of a prior execution of first code. In some embodiments, act 1201 comprises accessing a replayable recorded execution of a prior execution of first executable code, the replayable recorded execution storing data of at least one input that was consumed by a first sequence of executable instructions during the prior execution of the first executable code. For example, similar to act 501 of method 500, the data access component 115 can access a recorded execution 114 of a prior execution of application 112 (e.g., using the trace access sub-component 115a). As shown in FIG. 3, this recorded execution 114 might include at least one data stream 301a that includes a plurality of data packets 302, each of which can include a data inputs portion 304 that records inputs to executable instructions that executed as part of the prior execution of application 112.

Method 1200 also includes an act 1202 of accessing second code. In some embodiments, act 1202 comprises accessing second executable code that is different than the first executable code, execution of second executable code not being recorded in the replayable recorded execution. For example, similar to act 502 of method 500, the data access component 115 can access application 113 (e.g., using the code access sub-component 115b), a prior execution of which is not recorded in the accessed recorded execution 114.

Method 1200 also includes an act 1203 of determining that a recorded input is usable to replay the second code. In some embodiments, act 1203 comprises determining that the stored data of the at least one input is usable as an input to a second sequence of executable instructions of the second executable code. For example, as part of identifying functions that correspond between the first executable code and the second executable code, the function identification sub-component 116a can identify one or more inputs to a first function in the first executable code that correspond to one or more second inputs to a second function in the second executable code. In embodiments, the stored data of the at least one input that was consumed by a first sequence of executable instructions is "usable as an input" to the second sequence of executable instructions if there is a semantic relationship between the at least one input and a corresponding input that is consumed by the second sequence of executable instructions. For example, an input used by the first sequence of executable instructions might be semantically related to an input used by the second sequence of executable instructions if they correspond to the same variable, data structure, etc. in the first and second executable code—even if they might have been accessed at different locations by the first and second executable code, and/or even if they are of different data formats. To illustrate, the input that was consumed by the first sequence of executable instructions might correspond to a particular input variable (e.g., "A") used by the first sequence of executable instructions, and that was accessed by the first sequence of executable instructions at a particular memory address or at a particular register. This input might be semantically related to the same particular input variable (e.g. "A") used by the second sequence of executable instructions, even if that particular input variable is expected by the second sequence of executable instructions to be accessed at a different memory address or at a different register. Additionally, or alternatively, the input that was consumed by the first sequence of executable instructions might correspond to a particular input variable (e.g., "A") used by the first sequence of executable instructions, and that has a particular format (e.g., a 32-bit integer) expected by the first sequence of executable instructions. This input might be semantically related to the same particular input variable (e.g. "A") used by the second sequence of executable instructions, even if that particular input variable has a different format (e.g., a 64-bit integer) expected by the second sequence of executable instructions.

Method 1200 also includes an act 1204 of identifying a difference in how the first code accesses the input as compared to the second code. In some embodiments, act 1204 comprises identifying one or more differences between the first sequence of executable instructions and the second sequence of executable instructions, including identifying at least one difference in how the first sequence of executable instructions accessed the at least one input during recording, as compared to how the second sequence of executable instructions expect to access the at least one input. For example, the transformation identification sub-component 116b might determine differences in how inputs are passed to the first executable instructions as compared to the second executable instructions (e.g., memory location instead of register, register instead of memory location, one register instead of another register, one memory location instead of another memory location, etc.). As another example, the transformation identification sub-component 116b might determine differences in internal data structure layout used by the first executable instructions as compared to second executable instructions. Conceptually, act 1204 identifies how to map a first named resource (e.g., register, memory location, processor scratch area, etc.) used by the first code to a second named resource (e.g., register, memory location, processor scratch area, etc.) used by the second code. Notably, act 1204 might also include identifying an output of the second executable that maps to an output of the first executable code.

Method 1200 also includes an act 1205 of identifying one or more transformations that would enable the second code to access the input. In some embodiments, act 1205 comprises, based on the identified one or more differences, determining one or more location transformations that would enable the second sequence of executable instructions to access the stored data of the at least one input. For example, based on the differences identified in act 1204, the transformation identification sub-component 116*b* might determine one or more memory and/or register location transformations that would enable the second executable instructions to access the input(s). Notably, act 1205 might also include identifying a location transformation on an output of the second executable, that would project the output to a location expected by the first executable code.

Method 1200 also includes an act 1206 of emulating the second code using the replayable trace. In some embodiments, act 1206 comprises emulating execution of the second sequence of executable instructions using the stored data of the at least one input. For example, similar to act 504 of method 500, the code substitution component 117*a* can use the emulation component 110 to emulate execution of application 113's code, while using execution state data from recorded execution 114 including a recorded value for the at least one input. Act 1206 can include an act 1206*a* of projecting the one or more transformations on the input's location. In some embodiments, act 1206*a* comprises projecting the one or more location transformations to enable the second sequence of executable instructions to access the stored data of the at least one input. For example, the transformation projection sub-component 117*b* can project the location transformation(s) identified in act 1205. While, for simplicity, act 1206*a* is shown as being part of act 1206, it will be appreciated that act 1206*a* could be performed—at least in part—before and/or after act 1206 instead of, or in addition to, being part of act 1206.

Method 1200 may also include an act 1207 of transforming an output. In some embodiments, act 1207 comprises applying one or more location transformations to an output of emulating the second sequence of executable instructions, the one or more location transformations projecting the output to a location expected by the first executable code. For example, the transformation projection sub-component 117*b* might also project any output location transformations identified in act 1205 so that the first code can access an output of the second executable instructions.

As an example of applicability of method 1200, projecting the one or more location transformations might comprise projecting a register location storing the at least one input to a memory location expected by the second sequence of executable instructions for the at least one input. For example, an ABI change resulting from use of a different compiler, use of different compiler settings, a change in ISA, or a change in parameter order might result in an input being passed via a stack variable instead of a register. As such, the transformation projection sub-component 117*b* might project a traced register value into a memory location.

As another example of applicability of method 1200, projecting the one or more location transformations might comprise projecting a memory location storing the at least one input to a register location expected by the second sequence of executable instructions for the at least one input. For example, an ABI change resulting from use of a different compiler, use of different compiler settings, a change in ISA, or a change in parameter order might result in an input being passed via a register instead of a stack variable. As such, the transformation projection sub-component 117*b* might project a memory value into a register.

As another example of applicability of method 1200, projecting the one or more location transformations might comprise projecting a first register location storing the at least one input to a second register location expected by the second sequence of executable instructions for the at least one input. For example, an ABI change resulting from use of a different compiler, use of different compiler settings, a change in ISA, or a change in parameter order might result in an input being passed via different register than was used during tracing. As such, the transformation projection sub-component 117*b* might project a traced register value from one register to another register.

As another example of applicability of method 1200, projecting the one or more location transformations might comprise projecting a first memory location storing the at least one input to a second memory location expected by the second sequence of executable instructions for the at least one input. For example, an ABI change resulting from use of a different compiler, use of different compiler settings, a change in ISA, or a change in parameter order might result in an input being passed via different memory location than was used during tracing. As such, the transformation projection sub-component 117*b* might project a traced memory value from one memory address to another memory address.

As another example of applicability of method 1200, projecting the one or more location transformations might comprise mapping a data structure member from a first location within the data structure as accessed by the first sequence of executable instructions to a second location within the data structure as expected by the second sequence of executable instructions for the data structure member. For example, as demonstrated in FIG. 7, an int and char field might be swapped between applications 112 and 113. As such, the transformation projection sub-component 117*b* might project the traced data for these two fields into memory addresses expected by application 113.

As another example of applicability of method 1200, projecting the one or more location transformations might comprise mapping, to a same memory cell, both (i) a first memory address corresponding to the at least one input, and (ii) a second memory address expected by the second sequence of executable instructions for the at least one input. For example, as demonstrated in FIG. 6C, virtual addresses 0x852c020 and 0x160d020 might both be mapped to physical address 0xff020 so that both application 112 and 113 can access the appropriate traced data for the first element of global_array.

As another example of applicability of method 1200, projecting the one or more location transformations might comprise synchronizing a first memory location of the at least one input with a second memory location expected by the second sequence of executable instructions for the at least one input. As discussed, such synchronization might be performed as part of processing a breakpoint that is triggered when accessing one or both of the first memory location or the second memory location. For instance, there might be breakpoints on "both ends" (i.e., on the addresses expected by both application 112 and application 113), or there might a breakpoints on "one end" (i.e., on only the address expected by either application 112 or application 113).

As another example of applicability of method 1200, projecting the one or more location transformations might comprise, based at least on dereferencing a second memory address expected by the second sequence of executable instructions for the at least one input, substituting a first memory address corresponding to the at least one input. For example, referring to FIG. 6B, address 0x160d020 might be substituted for address 0x852c0202 when it is dereferenced during emulation. As discussed, symbols might be used to associate the first memory address with the second memory address.

As another example of applicability of method 1200, projecting the one or more location transformations might comprise tagging at least one of a memory location or a memory address to indicate that a transformation has been applied. For example, FIG. 8 demonstrated how reserved bits in a memory address might be used to store a tag.

Figure 13:
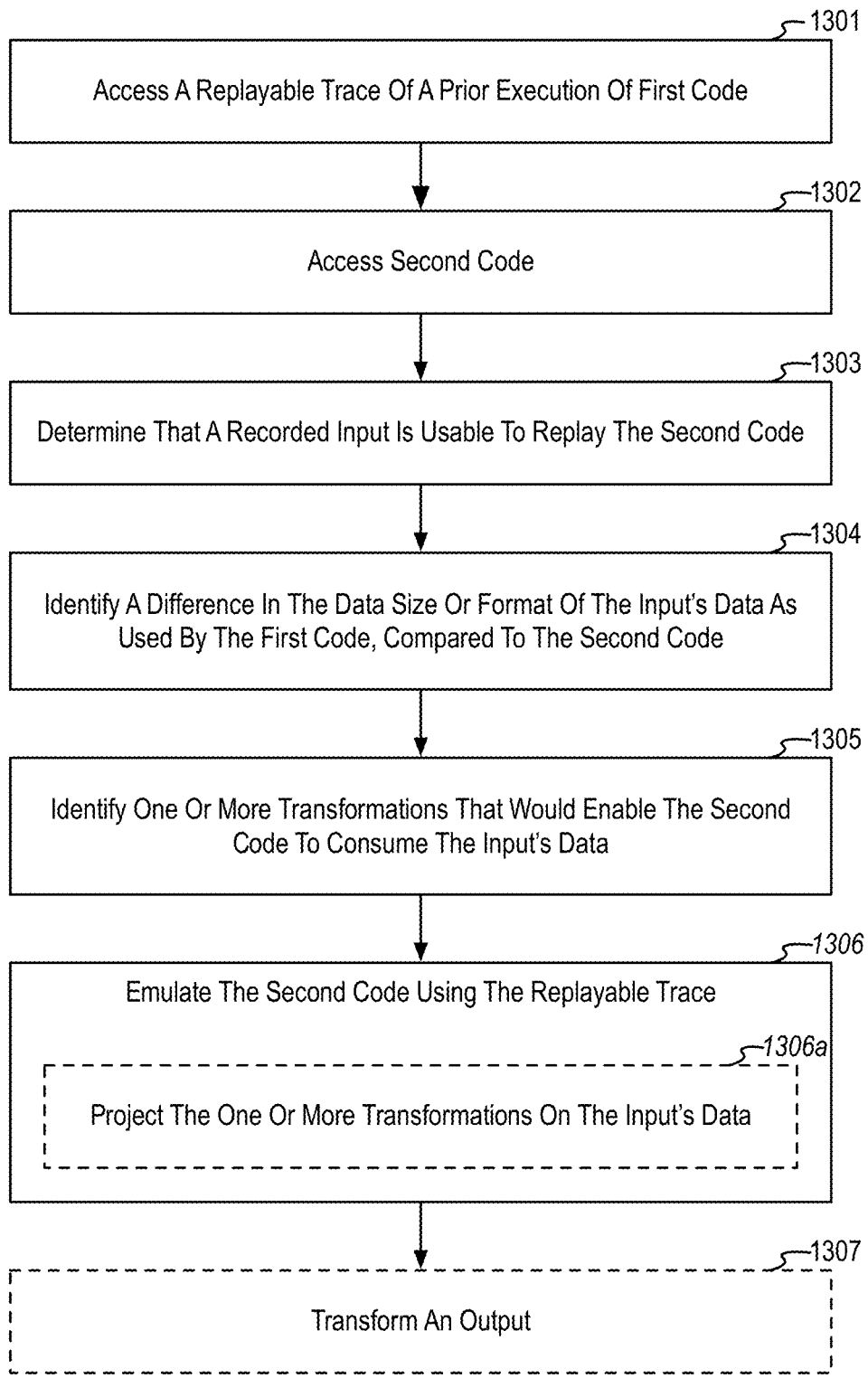
FIG. 13 illustrates a flowchart of an example method for transforming input data to enable execution of second executable code using trace data gathered during execution of first executable code.

FIG. 13 illustrates a flowchart of an example method 1300 for transforming input data to enable execution of second executable code using trace data gathered during execution of first executable code. In embodiments, method 1300 focuses primarily on transformations that allow for changes in an input and/or output's size and/or data format, including allowing for changes in pointer sizes. In embodiments, these transformations can also allow—among other things—for superset and subset conversions between an input's data size, conversions from larger pointer sizes to smaller pointer sizes, adapting to data structures having changes in overall data structure size, and the like. As will be appreciated, method 1300 might be embodied within a computer system and/or a computer program product.

As shown in FIG. 13, method 1300 includes an act 1301 of accessing a repayable trace of a prior execution of first code. In some embodiments, act 1301 comprises accessing a replayable recorded execution of a prior execution of first executable code, the replayable recorded execution storing data of at least one input that was consumed by a first sequence of executable instructions during the prior execution of the first executable code. For example, similar to acts 501 of method 500, the data access component 115 can access a recorded execution 114 of a prior execution of application 112 (e.g., using the trace access sub-component 115*a*). As shown in FIG. 3, this recorded execution 114 might include at least one data stream 301*a* that includes a plurality of data packets 302, each of which can include a data inputs portion 304 that records inputs to executable instructions that executed as part of the prior execution of application 112.

Method 1300 also includes an act 1302 of accessing second code. In some embodiments, act 1302 comprises accessing second executable code that is different than the first executable code, execution of second executable code not being recorded in the replayable recorded execution. For example, similar to act 502 of method 500, the data access component 115 can access application 113 (e.g., using the code access sub-component 115*b*), a prior execution of which is not recorded in the accessed recorded execution 114.

Method 1300 also includes an act 1303 of determining that a recorded input is usable to replay the second code. In some embodiments, act 1303 comprises determining that the stored data of at least one input is usable as an input to a second sequence of executable instructions of the second executable code. For example, as part of identifying functions that correspond between the first executable code and the second executable code, the function identification sub-component 116*a* can identify one or more inputs to a first function in the first executable code that correspond to one or more second inputs to a second function in the second executable code.

Method 1300 also includes an act 1304 of identifying a difference in the data size or format of the input's data as used by the first code, compared to the second code. In some embodiments, act 1304 comprises identifying one or more differences between the first sequence of executable instructions and the second sequence of executable instructions, including identifying at least one difference in at least one of a size or a format of the stored data of the at least one input as used by the first sequence of executable instructions during recording, as compared to an input size and format expected by the second sequence of executable instructions. For example, the transformation identification sub-component 116*b* might determine differences the data size of an input (e.g., a 32-bit data value vs. a 64-bit data value). As another example, the transformation identification sub-component 116*b* might determine differences the pointer size of an input (e.g., a 32-bit pointer vs. a 64-bit pointer). As yet another example, the transformation identification sub-component 116*b* might determine differences in the data format of an input (e.g., int vs. long). Notably, act 1304 might also include identifying an output of the second executable that maps to an output of the first executable code.

Method 1300 also includes an act 1305 of identifying one or more transformations that would enable the second code to consume the input's data. In some embodiments, act 1305 comprises, based on the identified one or more differences, determining one or more data transformations on the stored data of the at least one input that would enable the second sequence of executable instructions to consume the stored data of the at least one input. For example, based on the differences identified in act 1304, the transformation identification sub-component 116*b* might determine one or more data size or format transformations that would enable the second executable instructions to consume the input. Notably, act 1305 might also include identifying a data transformation on an output of the second executable, that would project the output into a data format expected by the first executable code.

Method 1300 also includes an act 1306 of emulating the second code using the replayable trace. In some embodiments, act 1306 comprises emulating execution of the second sequence of executable instructions using the stored data of the at least one input. For example, similar to act 504 of method 500, the code substitution component 117*a* can use the emulation component 110 to emulate execution of application 113's code, while using execution state data from recorded execution 114 including a recorded value for the at least one input. Act 1306 can include an act 1306*a* of projecting the one or more transformations on the input's data. In some embodiments, act 1306*a* comprises projecting the one or more data transformations on the stored data of the at least one input to enable the second sequence of executable instructions to consume the stored data of the at least one input. For example, the transformation projection sub-component 117*b* can project the data transformation(s) identified in act 1305. While, for simplicity, act 1306*a* is shown as being part of act 1306, it will be appreciated that act 1306*a* could be performed—at least in part—before and/or after act 1306 instead of, or in addition to, being part of act 1306.

Method 1300 may also include an act 1307 of transforming an output. In some embodiments, act 1307 comprises applying one or more data transformations to an output of emulating the second sequence of executable instructions, the one or more data transformations projecting the output into a data format expected by the first executable code. For example, the transformation projection sub-component 117*b* might also project any output data transformations identified in act 1305 so that the first code can consume an output of the second executable instructions.

As an example of applicability of method 1300, projecting the one or more data transformations might comprise performing a superset conversion between a first data size of the stored data of the at least one input to a larger second data size expected by the second sequence of executable instructions for the at least one input. For example, FIGS. 9A and 9B demonstrate a superset conversion, in which a 16-bit value is converted into a 32-bit value. As discussed, this may include sign-extending the stored data of the at least one input. For instance, FIG. 9A shows how to 0-extend a positive 16-bit value, while FIG. 9B shows how to 1-extend a negative 16-bit value. As discusses, symbols might be used to determine if the type of sign-extending that should be used.

As another example of applicability of method 1300, projecting the one or more data transformations might comprise performing a subset conversion of the stored data between a first data size of the at least one input to a smaller second data size expected by the second sequence of executable instructions for the at least one input. For example, FIGS. 10A and 10B demonstrate a subset conversion, in which a 36-bit value is converted into a 16-bit value. As discussed, prior to performing a subset conversion, the transformation projection sub-component 117b might verify that the stored data of the at least one input would fit within the second data size. In addition, the transformation projection sub-component 117b might monitor emulation of the second sequence of executable instructions to determine if a derivative of the converted stored data (e.g., an intermediary value obtained from emulation of the second executable instructions) exceeds the second data size.

As another example of applicability of method 1300, projecting the one or more data transformations might comprise: determining that a first memory address of the at least one input would not fit within an address space used by the second sequence of executable instructions for the at least one input, and mapping the first memory address to a second memory address that would fit within the address space used by the second sequence of executable instructions for the at least one input. For example, FIG. 11B demonstrates that the addresses for locations 19-22 in a simple 32-location address space might be mapped to the addresses for locations 9-12 in a simple 16-location address space.

As another example of applicability of method 1300, projecting the one or more data transformations might comprise mapping a data structure member from a first size within the data structure as accessed by the first sequence of executable instructions to a second size within the data structure as expected by the second sequence of executable instructions for the at least one input. For example, the transformation projection sub-component 117b might adapt for internal data structure size changes, such as the example above in which an int member of a Foo struct is changed to a long data type.

As another example of applicability of method 1300, projecting the one or more data transformations might comprise performing a format conversion between a first data format of the stored data of the at least one input to a second data format expected by the second sequence of executable instructions for the at least one input. For example, the transformation projection sub-component 117b might perform data conversions such as from a float or double to an int, or from a double to a float, etc. As noted, this may mean that the transformation projection sub-component 117b might round a value of the stored data, resulting in a loss of precision.

Figure 14:
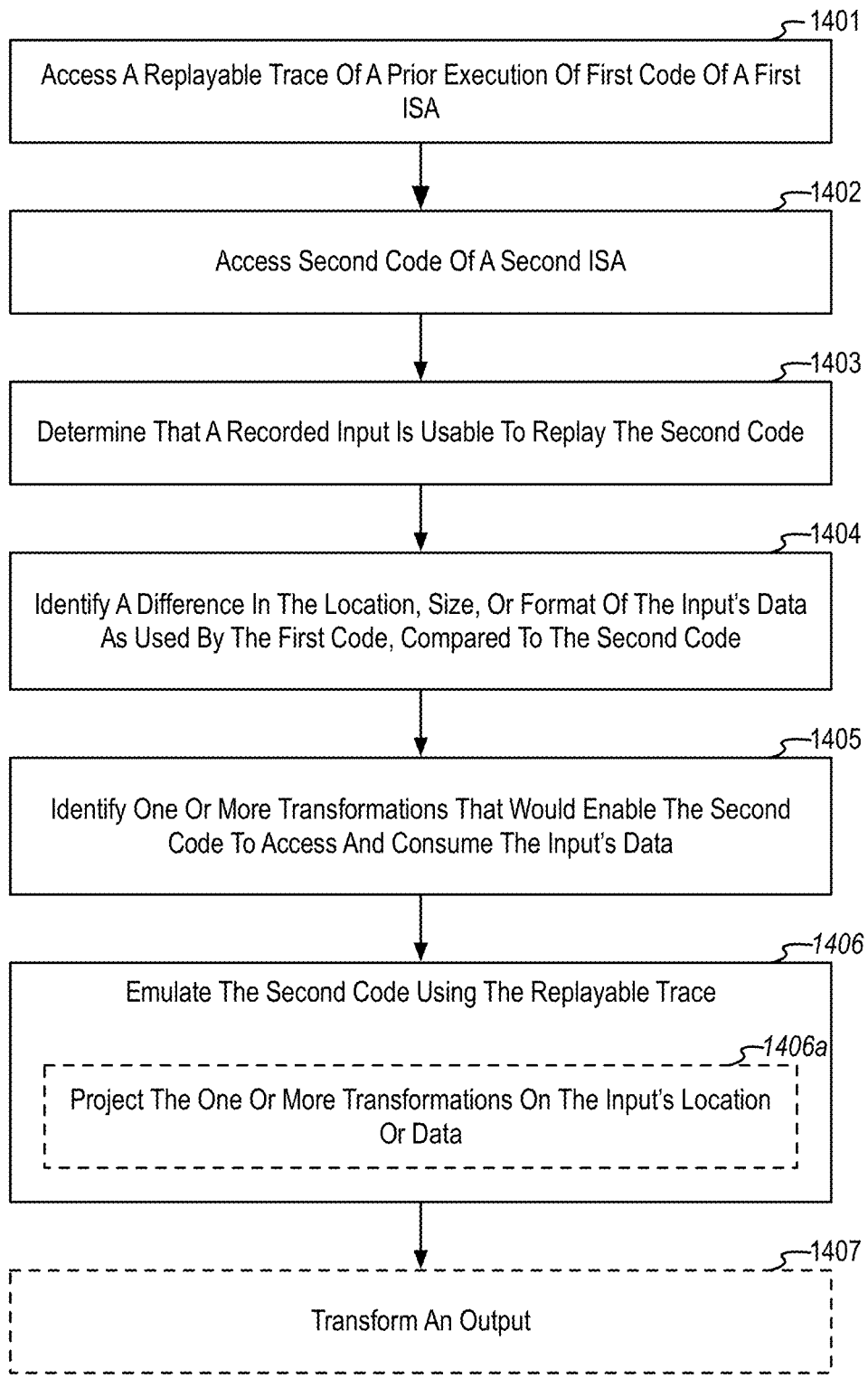
FIG. 14 illustrates a flowchart of an example method for emulating execution of second executable code of a second instruction set architecture (ISA) using trace data gathered during execution of first executable code of a first ISA.

FIG. 14 illustrates a flowchart of an example method 1400 for transforming input data to enable execution of second executable code using trace data gathered during execution of first executable code. In embodiments, method 1400 focuses primarily on transformations that allow for the ISA (e.g., x86, x86_64, ARM, MIPS, etc.) to change between the traced code in application 112 and the emulated code in application 113. As will be appreciated, method 1400 might be embodied within a computer system and/or a computer program product.

As shown in FIG. 14, method 1400 includes an act 1401 of accessing a repayable trace of a prior execution of first code of a first ISA. In some embodiments, act 1401 comprises accessing a replayable recorded execution of a prior execution of first executable code of a first ISA, the replayable recorded execution storing data of at least one input that was consumed by a first sequence of executable instructions of the first ISA during the prior execution of the first executable code. For example, similar to acts 501 of method 500, the data access component 115 can access a recorded execution 114 of a prior execution of application 112 (e.g., using the trace access sub-component 115a). Here, however, application 112 can use a first ISA, such as x86_64. As shown in FIG. 3, this recorded execution 114 might include at least one data stream 301a that includes a plurality of data packets 302, each of which can include a data inputs portion 304 that records inputs to executable instructions that executed as part of the prior execution of application 112.

Method 1400 also includes an act 1402 of accessing second code of a second ISA. In some embodiments, act 1402 comprises accessing second executable code of a second ISA, the second executable code including a second sequence of executable instructions of the second ISA, execution of second executable code not being recorded in the replayable recorded execution. For example, similar to act 502 of method 500, the data access component 115 can access application 113 (e.g., using the code access sub-component 115b), a prior execution of which is not recorded in the accessed recorded execution 114. here, however, application 113 can use a different second ISA, such as ARM.

Method 1400 also includes an act 1403 of determining that a recorded input is usable to replay the second code. In some embodiments, act 1403 comprises determining that the stored data of at least one input used by the first sequence of executable instructions of the first ISA is usable as an input to the second sequence of executable instructions of the second ISA. For example, as part of identifying functions that correspond between the first executable code and the second executable code, the function identification sub-component 116a can identify one or more inputs to a first function in the first executable code that correspond to one or more second inputs to a second function in the second executable code.

Method 1400 also includes an act 1404 of identifying a difference in the location, size, or format of the input's data as used by the first code, compared to the second code. In some embodiments, act 1404 comprises identifying one or more differences between the first sequence of executable instructions and the second sequence of executable instructions, including identifying at least one difference in at least one of a location, a size, or a format of the stored data of the at least one input compared to input location, size, and format expected by the second sequence of executable instructions. For example, the transformation identification sub-component 116b might determine location differences in how inputs are passed to the first executable instructions as compared to the second executable instructions, location differences in internal data structure layout used by the first executable instructions as compared to second executable instructions, etc. Additionally, or alternatively, the transformation identification sub-component 116*b* might determine data differences—such as differences in the data size of an input (e.g., a 32-bit data value vs. a 64-bit data value), differences in the pointer size of an input (e.g., a 32-bit pointer vs. a 64-bit pointer), differences in the data format of an input (e.g., int vs. long), etc. Notably, act 1404 might also include identifying an output of the second executable that maps to an output of the first executable code.

Method 1400 also includes an act 1405 of identifying one or more transformations that would enable the second code to access and consume the input's data. In some embodiments, act 1405 comprises, based on the identified one or more differences, determining one or more transformations on at least one of the location or the stored data of the at least one input that would enable the second sequence of executable instructions to access and consume the stored data of the at least one input. For example, based on the differences identified in act 1404, the transformation identification sub-component 116*b* might determine one or more location, data size, and/or format transformations that would enable the second executable instructions to consume the input. Notably, act 1405 might also include identifying a transformation on an output of the second executable, that would project the output to a location and/or a data format expected by the first executable code.

Method 1400 also includes an act 1406 of emulating the second code using the replayable trace. In some embodiments, act 1406 comprises, using an emulator of the second ISA, emulating execution of the second sequence of executable instructions using the stored data of the at least one input. For example, similar to act 504 of method 500, the code substitution component 117*a* can use the emulation component 110 to emulate execution of application 113's code, while using execution state data from recorded execution 114 including a recorded value for the at least one input. Here, the emulation component 110 can emulate the second ISA (e.g., ARM), even though the trace data was gathered when executing on the first ISA (e.g., x86_64). Act 1406 can include an act 1406*a* of projecting the one or more transformations on the input's location or data. In some embodiments, act 1406*a* comprises projecting the one or more transformations on at least one of the location or the stored data of the at least one input to enable the second sequence of executable instructions to access and consume the stored data of the at least one input. For example, the transformation projection sub-component 117*b* can project the location and/or data transformation(s) identified in act 1405. While, for simplicity, act 1406*a* is shown as being part of act 1406, it will be appreciated that act 1406*a* could be performed—at least in part—before and/or after act 1406 instead of, or in addition to, being part of act 1406.

Method 1400 may also include an act 1407 of transforming an output. In some embodiments, act 1407 comprises applying at least one of a data transformation or a location transformation to an output of emulating the second sequence of executable instructions, projecting the output to a location and/or a data format expected by the first executable code. For example, the transformation projection sub-component 117*b* might also project any output location or data transformations identified in act 1405 so that the first code can access and consume an output of the second executable instructions.

As discussed in connection with act 1405, the transformation identification sub-component 116*b* might identify transformations on at least one of the location or the stored data of the at least one input. Thus, projecting the one or more transformations could comprise projecting a location transformation—i.e., a transformation on an input's address or location. As will be appreciated in view of the discussion of method 1200, projecting a location transformation could include, for example, projecting a first register location storing the at least one input to a first memory location expected by the second sequence of executable instructions for the at least one input; projecting a second memory location storing the at least one input to a second register location expected by the second sequence of executable instructions for the at least one input; projecting a third register location storing the at least one input to a fourth register location expected by the second sequence of executable instructions for the at least one input; and/or projecting a third memory location storing the at least one input to a fourth memory location expected by the second sequence of executable instructions for the at least one input.

Additionally, or alternatively, projecting the one or more transformations could comprise projecting a data transformation—i.e., a transformation on an input's size, format, pointer size, etc. As will be appreciated in view of the discussion of method 1300, projecting a data transformation could include, for example, performing a superset conversion between a first data size of the stored data of the at least one input to a larger second data size expected by the second sequence of executable instructions for the at least one input; performing a subset conversion of the stored data between the first data size of the at least one input to a smaller third data size expected by the second sequence of executable instructions for the at least one input; mapping a first memory address of the at least one input to a second memory address that would fit within an address space used by the second sequence of executable instructions for the at least one input; mapping a data structure member from a first size within the data structure as accessed by the first sequence of executable instructions to a second size within the data structure as expected by the second sequence of executable instructions for the at least one input; and/or performing a format conversion between a first data format of the stored data of the at least one input to a second data format expected by the second sequence of executable instructions for the at least one input.

Additionally, or alternatively, projecting the one or more transformations could comprise projecting an endianness of the stored data of at least one input from a first endianness used by the first ISA to a second endianness used by the second ISA. For example, the projection sub-component 117*b* might convert and store data having the second endianness to a storage location is expected by the second sequence of executable instructions for accessing the at least one input. Alternatively, the projection sub-component 117*b* might dynamically convert the endianness between the first and second endianness when the second sequence of executable instructions read from, or write to, a storage location that is expected by the second sequence of executable instructions for accessing the at least one input.

While method 1200 focused primarily on location transformations, method 1300 focused primarily on data transformation, and method 1400 focused primarily on ISA transformations, it will be appreciated that these methods are fully combinable. Thus, for a given input or output, there could be a plurality transformations including both location and data transformations. These transformations can be used to emulate code of an application 113 having the same ISA as application 112, or to emulate code of an application 113 having a different ISA than application 112.

Figure 15:
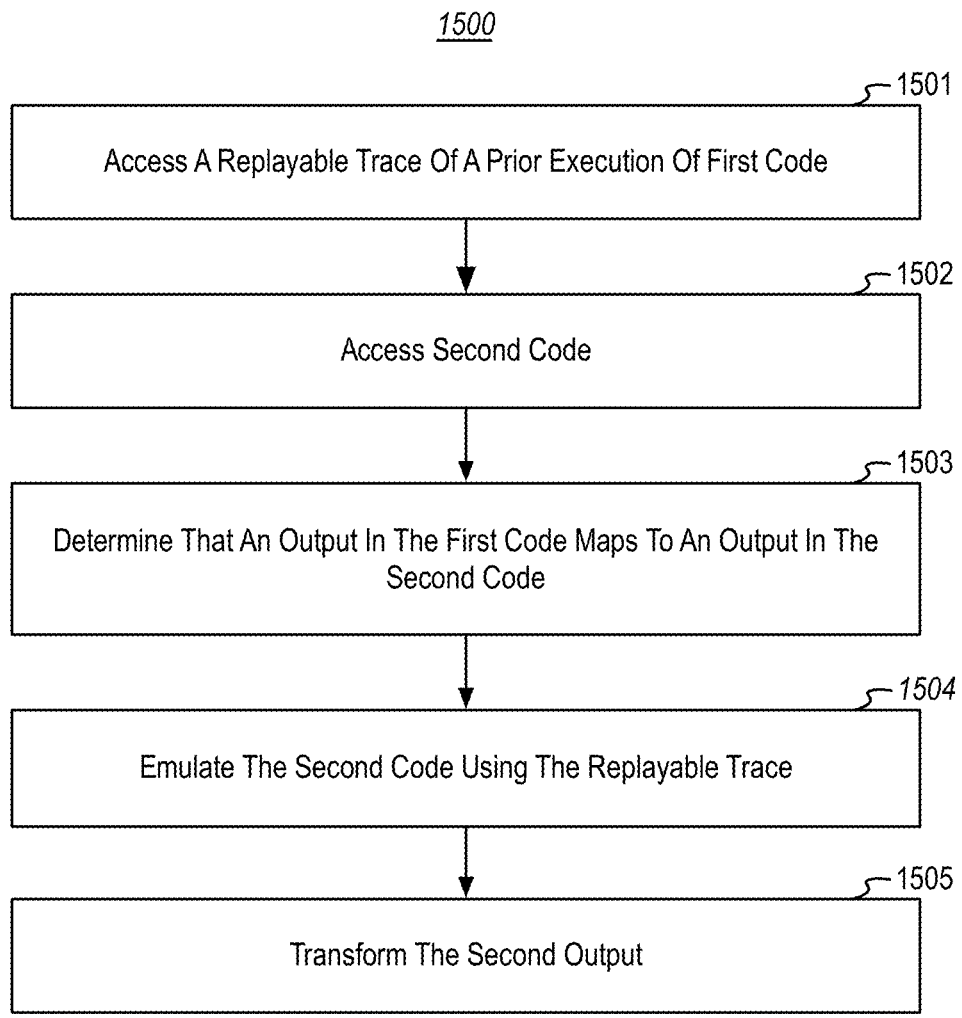
FIG. 15 illustrates a flowchart of an example method for transforming outputs based on emulating execution of second executable code using trace data gathered during execution of first executable code.

Additionally, while methods 1200-1400 focused primarily on transforming inputs, it will be appreciated that outputs could be transformed instead of, or in addition to, inputs (i.e., based on any of location transformations, data transformations, and/or ISA transformations). For example, FIG. 15 illustrates a flowchart of an example method 1500 for transforming outputs based on emulating execution of second executable code using trace data gathered during execution of first executable code. As will be appreciated, method 1500 might be embodied within a computer system and/or a computer program product.

As shown in FIG. 15, method 1500 includes an act 1501 of accessing a repayable trace of a prior execution of first code. In some embodiments, act 1501 comprises accessing a replayable recorded execution of a prior execution of first executable code, the replayable recorded execution including trace data recording execution of a first sequence of executable instructions during the prior execution of the first executable code. For example, similar to acts 1201, 1301, and 1401, the data access component 115 can access a recorded execution 114 of a prior execution of application 112 (e.g., using the trace access sub-component 115a). As shown in FIG. 3, this recorded execution 114 might include at least one data stream 301a that includes a plurality of data packets 302, each of which can include a data inputs portion 304 that records inputs to executable instructions that executed as part of the prior execution of application 112.

Method 1500 also includes an act 1502 of accessing second code. In some embodiments, act 1502 comprises accessing second executable code that is different than the first executable code, execution of second executable code not being recorded in the replayable recorded execution. For example, similar to acts 1202, 1302, and 1402, the data access component 115 can access application 113 (e.g., using the code access sub-component 115b), a prior execution of which is not recorded in the accessed recorded execution 114.

Method 1500 also includes an act 1503 of determining that an output in the first code maps to an output in the second code. In some embodiments, act 1503 comprises determining that a first output of the first sequence of executable instructions in the first executable code maps to a second output of a second sequence of executable instructions in the second executable code. For example, as part of identifying functions that correspond between the first executable code and the second executable code, the function identification sub-component 116a can identify one or more outputs from first function in the first executable code that correspond to one or more outputs from a second function in the second executable code.

Method 1500 also includes an act 1504 of emulating the second code using the replayable trace. In some embodiments, act 1504 comprises based at least on the first output mapping to the second output, emulating execution of the second sequence of executable instructions based at least on the trace data recording the execution of the first sequence of executable instructions. For example, similar to acts 1206, 1306, and 1406, the code substitution component 117a can use the emulation component 110 to emulate execution of application 113's code, while using execution state data from recorded execution 114.

Method 1500 also includes an act 1505 of transforming the second output. In some embodiments, act 1505 comprises applying one or more transformations on the second output, which project the second output resulting from emulation of the second sequence of executable instructions onto the first output. For example, the transformation projection sub-component 117b can project one or more transformations on the second output, to enable the first executable code to access the second output as if it was the first output. These transformations/projections can include any of the transformations/projections discussed herein.

For example, the transformations/projections can include location transformations. Thus, somewhat similar to act 1204, method 1500 could include identifying one or more differences between the first sequence of executable instructions and the second sequence of executable instructions, including identifying at least one difference in how the first sequence of executable instructions accessed the first output, as compared to how the second sequence of executable instructions access the second output. Then, somewhat similar to act 1205, method 1500 could include, based on the identified one or more differences, determining one or more location transformations that would enable the first executable code to access the second output. When applying the one or more transformations on the second output in act 1505, method 1500 might apply these one or more transformations to project the second output to a location of the first output. For example, these location transformations could project a first register location of the second output to a first memory location of the first output, project a second memory location of the second output to a second register location of the first output, project a third register location of the second output to a fourth register location of the first output, project a third memory location of the second output to a fourth memory location of the first output, and the like.

Additionally, or alternatively, the transformations/projections can include data transformations. Thus, somewhat similar to act 1304, method 1500 could include identifying one or more differences between the first sequence of executable instructions and the second sequence of executable instructions, including identifying at least one difference in at least one of a size or a format of data of the first output as used by the first sequence of executable instructions, as compared to an output size and format used by the second sequence of executable instructions. Then, somewhat similar to act 1305, method 1500 could include, based on the identified one or more differences, determining one or more data transformations on the second output that would enable the first executable code to consume the data of the second output. When applying the one or more transformations on the second output in act 1505, method 1500 might apply these one or more data transformations to project the data of the second output into a data format expected by the first executable code. For example, these data transformations could perform a superset conversion between a first data size of the data of the second output to a larger second data size expected by the first executable code for the first output, perform a subset conversion between the first data size of the data of the second output to a smaller third data size expected by the first executable code for the first output, map a first memory address of the second output to a second memory address that would fit within an address space used by the first executable code for the first output, map a data structure member from a first size within the data structure as stored by the second output to a second size within the data structure as expected by the first executable code for the first output, perform a format conversion between a first data format of the second output to a second data format expected by the first executable code for the first output, and the like.

Additionally, or alternatively, the transformations/projections can include ISA transformations. For example, method 1500 could operate where the first executable code uses a first ISA and the second executable code uses a second ISA. Then, when applying the one or more transformations on the second output in act 1505, method 1500 might apply one or more location and/or data transformations to project the location and data of the second output into a location and data format expected by the first executable code. In addition (or as an alternative) to the location and/or data transformations already discussed, method 1500 might apply an endianness transformation to the second output. Thus, for example, applying the one or more transformations on the second output in act 1505 could comprise projecting an endianness of the second output from a second endianness used by the second ISA to a first endianness used by the first ISA.

Method 1500 might also include transforming/projecting inputs. Thus, the replayable recorded execution might store data of at least one input that was consumed by the first sequence of executable instructions during the prior execution of the first executable code, and method 1500 might comprise determining that at least one input is usable as an input to the second sequence of executable instructions of the second executable code. Then, when emulating execution of the second sequence of executable instructions based at least on the trace data recording the execution of the first sequence of executable instructions, method 1500 might include projecting one or more transformations to enable the second sequence of executable instructions to access and consume the stored data of the at least one input.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, implemented at a computer system that includes one or more processors and a memory, for mapping input locations to enable execution of second executable code using trace data gathered during execution of first executable code, the method comprising:
    accessing a replayable recorded execution of a prior execution of first executable code, the replayable recorded execution including stored data of a first input that was consumed by a first sequence of executable instructions as an internal member of a data structure during the prior execution of the first executable code;
    accessing second executable code that is different than the first executable code, execution of the second executable code not being recorded in the replayable recorded execution;
    identifying a mapping between the first sequence of executable instructions and a second sequence of executable instructions in the second executable code, including identifying a mapping between the first input and a second input that is consumed by the second sequence of executable instructions as the internal member of the data structure;
    determining that the stored data of the first input is usable as the second input to the second sequence of executable instructions of the second executable code;
    identifying one or more differences between the first sequence of executable instructions and the second sequence of executable instructions, including identifying at least one difference in how the first sequence of executable instructions accessed the first input during recording, as compared to how the second sequence of executable instructions access the second input, the at least one difference including a difference in a first offset within the data structure that is used by the first sequence of executable instructions to access the internal member of the data structure as the first input versus a different second offset within the data structure that is used by the second sequence of executable instructions to access the internal member of the data structure as the second input;
    based on the identified one or more differences, determining one or more location transformations that would enable the second sequence of executable instructions to access the stored data of the first input when emulating execution of the second sequence of executable instructions using the replayable recorded execution; and
    emulating execution of the second sequence of executable instructions using the replayable recorded execution, including projecting the one or more location transformations to enable the second sequence of executable instructions to access the stored data of the first input included in the replayable recorded execution, wherein projecting the one or more location transformations comprises mapping the internal member of the data structure from the first offset within the data structure as used by the first sequence of executable instructions to the different second offset within the data structure as used by the second sequence of executable instructions.

2. The method of claim 1, further comprising applying one or more location transformations to an output of emulating the second sequence of executable instructions, the one or more location transformations projecting the output to a location expected by the first executable code.

3. The method of claim 1, wherein projecting the one or more location transformations comprises projecting the first input from a first location expected by a first application binary interface (ABI) of a first function comprising the first sequence of executable instructions to a second location expected by a second ABI of a second function comprising the second sequence of executable instructions for the second input.

4. The method of claim 1, wherein projecting the one or more location transformations comprises mapping, to a same memory cell, both (i) a first memory address corresponding to the first input, and (ii) a second memory address expected by the second sequence of executable instructions for the second input.

5. The method of claim 1, wherein projecting the one or more location transformations comprises synchronizing a first memory location of the first input with a second memory location expected by the second sequence of executable instructions for the second input.

6. The method of claim 5, wherein the synchronization is performed as part of processing a breakpoint that is triggered when accessing one or both of the first memory location or the second memory location.

7. The method of claim 1, wherein projecting the one or more location transformations comprises, based at least on dereferencing a second memory address expected by the second sequence of executable instructions for the second input, substituting a first memory address corresponding to the first input.

8. The method of claim 7, further comprising using symbols to associate the first memory address with the second memory address.

9. The method of claim 1, wherein projecting the one or more location transformations comprises tagging at least one of a memory location or a memory address to indicate that a transformation has been applied.

10. The method of claim 1, further comprising:
accessing the first executable code; and
analyzing the first executable code against the second executable code in order to identify the mapping between the first sequence of executable instructions and the second sequence of executable instructions.

11. The method of claim 1, wherein projecting the one or more location transformations comprises using virtual addressing to map a plurality of virtual memory address to a single physical memory address.

12. The method of claim 11, wherein the plurality of virtual memory address includes a first virtual memory address corresponding to a handle for the data structure, and a second virtual memory address corresponding to an alias for the data structure.

13. A computer system comprising:
at least one processor; and
at least one computer-readable media storing computer-executable instructions that are executable by the at least one processor to cause the computer system to map input locations to enable execution of second executable code using trace data gathered during execution of first executable code, the computer-executable instructions including instructions that are executable by the at least one processor to cause the computer system to perform at least:
access a replayable recorded execution of a prior execution of first executable code, the replayable recorded execution including stored data of a first input that was consumed by a first sequence of executable instructions as an internal member of a data structure during the prior execution of the first executable code;
access second executable code that is different than the first executable code, execution of the second executable code not being recorded in the replayable recorded execution;
identify a mapping between the first sequence of executable instructions and a second sequence of executable instructions in the second executable code, including identifying a mapping between the first input and a second input that is consumed by the second sequence of executable instructions as the internal member of the data structure;
determine that the stored data of the first input is usable as the second input to the second sequence of executable instructions of the second executable code;
identify one or more differences between the first sequence of executable instructions and the second sequence of executable instructions, including identifying at least one difference in how the first sequence of executable instructions accessed the first input during recording, as compared to how the second sequence of executable instructions access the second input, the at least one difference including a difference in a first offset within the data structure that is used by the first sequence of executable instructions to access the internal member of the data structure as the first input versus a different second offset within the data structure that is used by the second sequence of executable instructions to access the internal member of the data structure as the second input;
based on the identified one or more differences, determine one or more location transformations that would enable the second sequence of executable instructions to access the stored data of the first input when emulating execution of the second sequence of executable instructions using the replayable recorded execution; and
emulate execution of the second sequence of executable instructions using the replayable recorded execution, including projecting the one or more location transformations to enable the second sequence of executable instructions to access the stored data of the first input included in the replayable recorded execution, wherein projecting the one or more location transformations comprises mapping the internal member of the data structure from the first offset within the data structure as used by the first sequence of executable instructions to the different second offset within the data structure as used by the second sequence of executable instructions.

14. The computer system of claim 13, the computer-executable instructions also including instructions that are executable by the at least one processor to cause the computer system to apply one or more location transformations to an output of emulating the second sequence of executable instructions, the one or more location transformations projecting the output to a location expected by the first executable code.

15. The computer system of claim 13, wherein projecting the one or more location transformations comprises at least one of:
mapping, to a same memory cell, both (i) a first memory address corresponding to the first input, and (ii) a second memory address expected by the second sequence of executable instructions for the second input;
synchronizing a first memory location of the first input with a second memory location expected by the second sequence of executable instructions for the second input;
based at least on dereferencing the second memory address expected by the second sequence of executable instructions for the second input, substituting the first memory address corresponding to the first input; or
tagging at least one of a memory location or a memory address to indicate that a transformation has been applied.

16. The method of claim 9, wherein projecting the one or more location transformations comprises tagging a memory location to indicate that a transformation has been applied, and wherein tagging the memory location comprises storing a tag value in reserved bits of a memory address corresponding to the memory location.

17. The method of claim 9, wherein projecting the one or more location transformations comprises tagging a memory address to indicate that a transformation has been applied and wherein tagging the memory address comprises storing a tag value in reserved bits of the memory address.

18. The computer system of claim 13, wherein projecting the one or more location transformations comprises using virtual addressing to map a plurality of virtual memory address to a single physical memory address.

19. The computer system of claim 18, wherein the plurality of virtual memory address includes a first virtual memory address corresponding to a handle for the data structure, and a second virtual memory address corresponding to an alias for the data structure.

20. A computer program product comprising at least one hardware storage device storing computer-executable instructions that are executable by at least one processor to cause a computer system to map input locations to enable execution of second executable code using trace data gathered during execution of first executable code, the computer-executable instructions including instructions that are executable by the at least one processor to cause the computer system to perform at least:
- access a replayable recorded execution of a prior execution of first executable code, the replayable recorded execution including stored data of a first input that was consumed by a first sequence of executable instructions as an internal member of a data structure during the prior execution of the first executable code;
- access second executable code that is different than the first executable code, execution of the second executable code not being recorded in the replayable recorded execution;
- identify a mapping between the first sequence of executable instructions and a second sequence of executable instructions in the second executable code, including identifying a mapping between the first input and a second input that is consumed by the second sequence of executable instructions as the internal member of the data structure;
- determine that the stored data of the first input is usable as the second input to the second sequence of executable instructions of the second executable code;
- identify one or more differences between the first sequence of executable instructions and the second sequence of executable instructions, including identifying at least one difference in how the first sequence of executable instructions accessed the first input during recording, as compared to how the second sequence of executable instructions access the second input, the at least one difference including a difference in a first offset within the data structure that is used by the first sequence of executable instructions to access the internal member of the data structure as the first input versus a different second offset within the data structure that is used by the second sequence of executable instructions to access the internal member of the data structure as the second input;
- based on the identified one or more differences, determine one or more location transformations that would enable the second sequence of executable instructions to access the stored data of the first input when emulating execution of the second sequence of executable instructions using the replayable recorded execution; and
- emulate execution of the second sequence of executable instructions using the replayable recorded execution, including projecting the one or more location transformations to enable the second sequence of executable instructions to access the stored data of the first input included in the replayable recorded execution, wherein projecting the one or more location transformations comprises mapping the internal member of the data structure from the first offset within the data structure as used by the first sequence of executable instructions to the different second offset within the data structure as used by the second sequence of executable instructions.

* * * * *